(12) United States Patent
Takahama

(10) Patent No.: US 11,908,076 B2
(45) Date of Patent: Feb. 20, 2024

(54) DISPLAY SYSTEM AND DISPLAY METHOD

(71) Applicant: Komatsu Ltd., Tokyo (JP)

(72) Inventor: Kazuhisa Takahama, Tokyo (JP)

(73) Assignee: Komatsu Ltd., Tokyo (JP)

( * ) Notice: Subject to any disclaimer, the term of this patent is extended or adjusted under 35 U.S.C. 154(b) by 169 days.

(21) Appl. No.: 17/605,272

(22) PCT Filed: May 26, 2020

(86) PCT No.: PCT/JP2020/020749
§ 371 (c)(1),
(2) Date: Oct. 21, 2021

(87) PCT Pub. No.: WO2020/241640
PCT Pub. Date: Dec. 3, 2020

(65) Prior Publication Data
US 2022/0230391 A1    Jul. 21, 2022

(30) Foreign Application Priority Data
May 31, 2019   (JP) ................................ 2019-103166

(51) Int. Cl.
*G06T 17/05* (2011.01)
(52) U.S. Cl.
CPC ................... *G06T 17/05* (2013.01)
(58) Field of Classification Search
CPC ...................................................... G06T 17/05
USPC ....................................................... 345/419
See application file for complete search history.

(56) References Cited

U.S. PATENT DOCUMENTS

| | | | | |
|---|---|---|---|---|
| 5,646,844 | A | * | 7/1997 | Gudat .................. G05D 1/0297 701/50 |
| 11,549,238 | B2 | * | 1/2023 | Nakazawa ............. G06V 20/56 |
| 2005/0027420 | A1 | | 2/2005 | Fujishima et al. |
| 2006/0026101 | A1 | | 2/2006 | Ogura et al. |
| 2017/0175364 | A1 | | 6/2017 | Hasegawa et al. |

(Continued)

FOREIGN PATENT DOCUMENTS

| | | |
|---|---|---|
| JP | H11-222882 A | 8/1999 |
| JP | 2005-011058 A | 1/2005 |

(Continued)

OTHER PUBLICATIONS

US 5,526,002 A, 06/1996, Gudat et al. (withdrawn)

*Primary Examiner* — Thomas J Lett
(74) *Attorney, Agent, or Firm* — Locke Lord LLP

(57) ABSTRACT

A display system for a work machine includes an acquisition unit configured to acquire three-dimensional data of a plurality of measurement points, a conversion unit configured to convert the three-dimensional data into a vehicle body coordinate system, an image generation unit configured to generate a reference image representing a three-dimensional shape of a terrain based on the three-dimensional data converted into the vehicle body coordinate system, and a display processing unit configured to display the reference image on a captured image in a superimposed manner. The image generation unit decides a display form of the reference image at a position of the reference image corresponding to each measurement point depending on a distance of the measurement point in a normal direction with respect to a ground surface of the work machine.

15 Claims, 15 Drawing Sheets

(56) References Cited

U.S. PATENT DOCUMENTS

| | | | | |
|---|---|---|---|---|
| 2018/0051446 A1* | 2/2018 | Yoshinada | ............. | E02F 9/264 |
| 2019/0024348 A1* | 1/2019 | Hiekata | .................. | E02F 9/267 |
| 2019/0253641 A1 | 8/2019 | Matsuda et al. | | |
| 2019/0330825 A1 | 10/2019 | Tanimoto et al. | | |
| 2019/0387219 A1 | 12/2019 | Kondo et al. | | |
| 2020/0031281 A1 | 1/2020 | Watanabe et al. | | |
| 2021/0404151 A1* | 12/2021 | Nakazawa | ............. | E02F 9/262 |

FOREIGN PATENT DOCUMENTS

| | | |
|---|---|---|
| JP | 2007-048185 A | 2/2007 |
| JP | 2016-160741 A | 9/2016 |
| JP | 2018-035645 A | 3/2018 |
| JP | 2018-056953 A | 4/2018 |
| JP | 2018-059268 A | 4/2018 |
| JP | 2018-152738 A | 9/2018 |
| WO | 2016/111148 A1 | 7/2016 |

\* cited by examiner

DISPLAY SYSTEM AND DISPLAY METHOD

TECHNICAL FIELD

The present invention relates to a display system and a display method.

Priority is claimed on Japanese Patent Application No. 2019-103166, filed May 31, 2019, the content of which is incorporated herein by reference.

BACKGROUND ART

In a case where a work machine is remotely operated, a displayed image is two-dimensional in an operation using an image viewed from an operator of the work machine, and accordingly, the sense of perspective is poor. For this reason, it is difficult to recognize the distance between a work target and the work machine, and there is a possibility that work efficiency is degraded. Even in a case where the operator of the work machine operates work equipment, it may be difficult to recognize the distance between the work equipment and the work target depending on the level of skill of the operator, and there is a possibility that work efficiency is degraded. An example of an image display system for solving such a problem is described in Patent Document 1. The image display system described in Patent Document 1 includes an imaging device that is attached to a work machine provided with work equipment having a work tool, a posture detection device that detects a posture of the work equipment, a distance detection device that obtains information regarding a distance to a work target of the work machine, and a processing device that generates an image of a portion corresponding to the work tool on the work target facing the work tool using information regarding a position of the work tool obtained using the posture of the work equipment and information regarding a position of the work target obtained from information regarding the distance obtained by the distance detection device and combines the generated image with an image of the work target captured by the imaging device to display a combined image on a display device. With the image display system described in Patent Document 1, it is possible to suppress degradation of work efficiency in working using the work machine provided with the work equipment having the work tool.

In the image display system described in Patent Document 1, the processing device generates line images along a surface of the work target using information regarding the position of the work target, combines the line images and the image of the work target, and displays a combined image on a display device. Since the line images are displayed along the shape of a terrain (work target) to be worked, a sense of distance on a terrain surface is easily recognized, and a sense of perspective is easily recognized.

Patent Document 2 describes a configuration for creating a color elevation map expressed by gradation colors in which a color is allocated to each elevation value such that the color transitions depending on the elevation value. According to the configuration described in Patent Document 2, it is possible to color line images with the gradation colors depending on the elevation.

CITATION LIST

Patent Documents

[Patent Document 1]
Japanese Unexamined Patent Application, First Publication No. 2016-160741
[Patent Document 2]
Japanese Unexamined Patent Application, First Publication No. 2007-048185

SUMMARY OF INVENTION

Technical Problem

In a case where the configuration described in Patent Document 1 and the configuration described in Patent Document 2 are combined, the line images along the surface of the work target can be colored with the gradation colors depending on the elevation, and thus, ruggedness or the like of the surface of the work target is more easily understood. Note that, in a case where change in color is decided with reference to a horizontal plane, for example, as shown in FIG. 21, there is a problem in that, while a work machine 400 is climbing a slope ground 401, ruggedness 402 in the slope ground 401 cannot be color-coded and displayed. FIG. 21 is a schematic view showing an example of color-coding the slope ground 401, on which the work machine 400 travels or performs work, depending on an elevation. In FIG. 21, change in density of hatching indicates change in coloring. Alternatively, in a case where coloring is changed depending on the elevation, there is a problem in that all small ruggedness are colored with the same color when a difference in elevation of a target range is large.

The invention has been accomplished in view of the above-described situation, and an object of the invention is to provide a display system and a display method capable of solving the above-described problem.

Solution to Problem

To solve the above-described problem, an aspect of the invention provides a display system for a work machine including an acquisition unit configured to acquire three-dimensional data of a plurality of measurement points measured by a distance detection device mounted in a work machine, a conversion unit configured to convert the three-dimensional data into a vehicle body coordinate system defined in association with a vehicle body of the work machine, an image generation unit configured to generate a reference image representing a three-dimensional shape of a terrain based on the three-dimensional data converted into the vehicle body coordinate system, and a display processing unit configured to display the reference image on an image captured by an imaging device in a superimposed manner. The image generation unit decides a display form of the reference image at a position of the reference image corresponding to each measurement point depending on a distance of the measurement point in a normal direction with respect to a ground surface of the work machine.

Advantageous Effects of Invention

According to the aspect of the invention, since it is possible to change the display form of a target on which the work machine travels or performs work, depending on the distance in the normal direction with respect to the ground surface of the work machine, for example, it is possible to make a display form of ruggedness or the like present on a slope ground different from a display form of a periphery.

DESCRIPTION OF EMBODIMENTS

Figure 1:
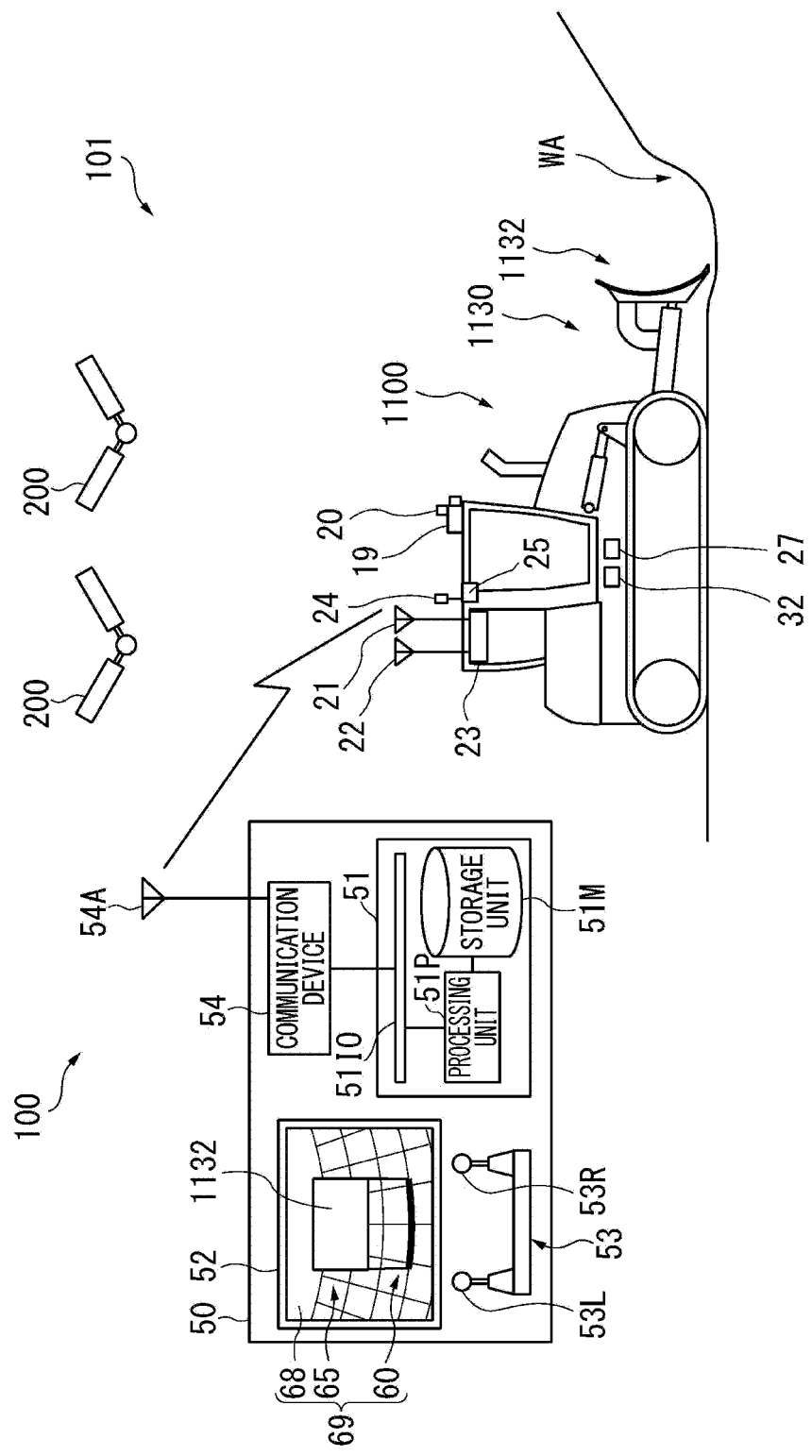
FIG. 1 is a diagram showing an image display system for a work machine and a remote operation system for a work machine according to an embodiment.

A mode (embodiment) for carrying out the invention will be described in detail referring to the drawings. In the drawings, the same or corresponding components are represented by the same reference numerals, and description thereof will not be repeated.

<Outline of Image Display System of Work Machine and Remote Operation System of Work Machine>

FIG. 1 is a diagram showing an image display system 100 for a work machine (display system) and a remote operation system 101 for a work machine according to the embodiment. The image display system 100 for a work machine (hereinafter, appropriately referred to as an image display system 100) images a work target of a bulldozer 1100, and more specifically, a terrain surface as a target of work by work equipment 1130 provided in the bulldozer 1100, that is, a work target WA and a blade 1132 as a work tool with an imaging device 19 and displays the obtained images on a display device 52 when the operator remotely operates the bulldozer 1100 as the work machine. In this case, the image display system 100 displays an image 69 for work, for example, including an image 68 of the work target WA captured by the imaging device 19, a lattice image 65, and an image 60 for indicating a position of the blade 1132 on the work target WA, on the display device 52. Here, the lattice image 65 is an aspect of an "image representing a three-dimensional shape of a terrain surface (terrain)" (hereinafter, also referred to as a "reference image"). The reference image can be composed using, for example, a plurality of point images, a plurality of line images, a lattice image consisting of plurality of line images, or the like.

The image display system 100 includes the imaging device 19, a posture detection device 32, a distance detection device 20, and a processing device 51. The remote operation system 101 for a work machine (hereinafter, appropriately referred to as a remote operation system 101) includes the imaging device 19, the posture detection device 32, the distance detection device 20, a work equipment control device 27, the display device 52, the processing device 51, and an operation device 53. In the embodiment, the imaging device 19, the posture detection device 32, and the distance detection device 20 of the image display system 100 are provided in the bulldozer 1100, and the processing device 51 is provided in the facility 50. The facility 50 is a facility that remotely operates the bulldozer 1100 or manages the bulldozer 1100. In the embodiment, the imaging device 19, the posture detection device 32, the distance detection device 20, and the work equipment control device 27 of the remote operation system 101 are provided in the bulldozer 1100, and the display device 52, the processing device 51, and the operation device 53 are provided in the facility 50.

The processing device 51 of the image display system 100 includes a processing unit 51P, a storage unit 51M, and an input-output unit 51IO. The processing unit 51P is, for example, a processor, such as a central processing unit (CPU). The storage unit 51M is, for example, random access memory (RAM), read only memory (ROM), a hard disk drive, a storage device, or a combination thereof. The input-output unit 51IO is an interface circuit for connecting the processing device 51 and external equipment. In the embodiment, the display device 52, the operation device 53, and a communication device 54 as the external equipment are connected to the input-output unit 51IO. The external equipment that is connected to the input-output unit 51IO is not limited thereto.

The processing device 51 generates the lattice image 65 as the reference image and an image 60 of a portion corresponding to the blade 1132 on the work target WA facing the blade 1132 using information regarding a position of blade 1132 as a work tool obtained using a posture of the work equipment 1130 and information regarding a position of the work target WA obtained from information regarding a distance obtained by the distance detection device 20 with the imaging device 19 as a reference. Then, the processing device 51 combines the generated images 65 and 60 and the image 68 of the work target WA captured by the imaging device 19 and displays a combined image on the display device 52. The work target WA is a surface on which the work equipment 1130 of the bulldozer 1100 performs work, such as excavation or ground leveling. The display of the image 60 may be omitted.

The display device 52 is, for example, but is not limited to, a liquid crystal display or a projector. The communication device 54 is provided with an antenna 54A. The communication device 54 performs communication with a communication device 25 provided in the bulldozer 1100 to acquire information regarding the bulldozer 1100 or to transmit information to the bulldozer 1100.

The operation device 53 has a left operation lever 53L that is provided on a left side of the operator, a right operation lever 53R that is provided on a right side of the operator, and a brake pedal and a decelerator pedal (not shown). The right operation lever 53R is operated to set a movement amount of a lifting operation or a lowering operation of the blade 1132. The right operation lever 53R receives the lowering operation through an operation being tilted forward and receives the lifting operation through an operation being tilted rearward. The left operation lever 53L is operated to set a moving direction of a traveling device 1120. The left operation lever 53L receives a forward movement operation through an operation being tilted forward and receives a rearward movement operation through an operation being tilted rearward. The left operation lever 53L receives a left swing operation through an operation being tilted to the left and receives a right swing operation through an operation being tilted to the right. The brake pedal (not shown) is operated to brake the traveling device 1120. The decelerator pedal (not shown) is operated to reduce a rotation speed of the traveling device 1120.

Operation amounts of the left operation lever 53L and the right operation lever 53R are detected by, for example, a potentiometer, a Hall IC, or the like, and the processing device 51 generates a control signal for controlling an electromagnetic control valve based on detection values. This signal is sent to the work equipment control device 27 through the communication device 54 of the facility 50 and the communication device 25 of the bulldozer 1100. The work equipment control device 27 controls the work equipment 1130 by controlling the electromagnetic control valve based on the control signal. The electromagnetic control valve will be described below.

The processing device 51 acquires an input on at least one of the left operation lever 53L and the right operation lever 53R and generates a command for operating the work equipment 1130 or the like. The processing device 51 transmits the generated command to the communication device 25 of the bulldozer 1100 through the communication device 54. The work equipment control device 27 provided in the bulldozer 1100 acquires the command from the processing device 51 through the communication device 25 and operates the work equipment 1130 or the like in association with the command.

The bulldozer 1100 includes the communication device 25, the work equipment control device 27, the posture detection device 32, the imaging device 19, the distance detection device 20, antennas 21 and 22, and a global position calculation device 23. The work equipment control device 27 controls the work equipment 1130 or the like. The communication device 25 is connected to an antenna 24 and performs communication with the communication device 54 provided in the facility 50. The posture detection device 32 detects a posture of at least one of the work equipment 1130 and the bulldozer 1100. The imaging device 19 is attached to the bulldozer 1100 to image the work target WA. The distance detection device 20 obtains information regarding a distance between a predetermined position of the bulldozer 1100 and the work target WA. The antennas 21 and 22 receive radio waves from positioning satellites 200. The global position calculation device 23 obtains global positions of the antennas 21 and 22, that is, positions in global coordinates using radio waves received by the antennas 21 and 22.

<Overall Configuration of Bulldozer 1100>

Figure 2:
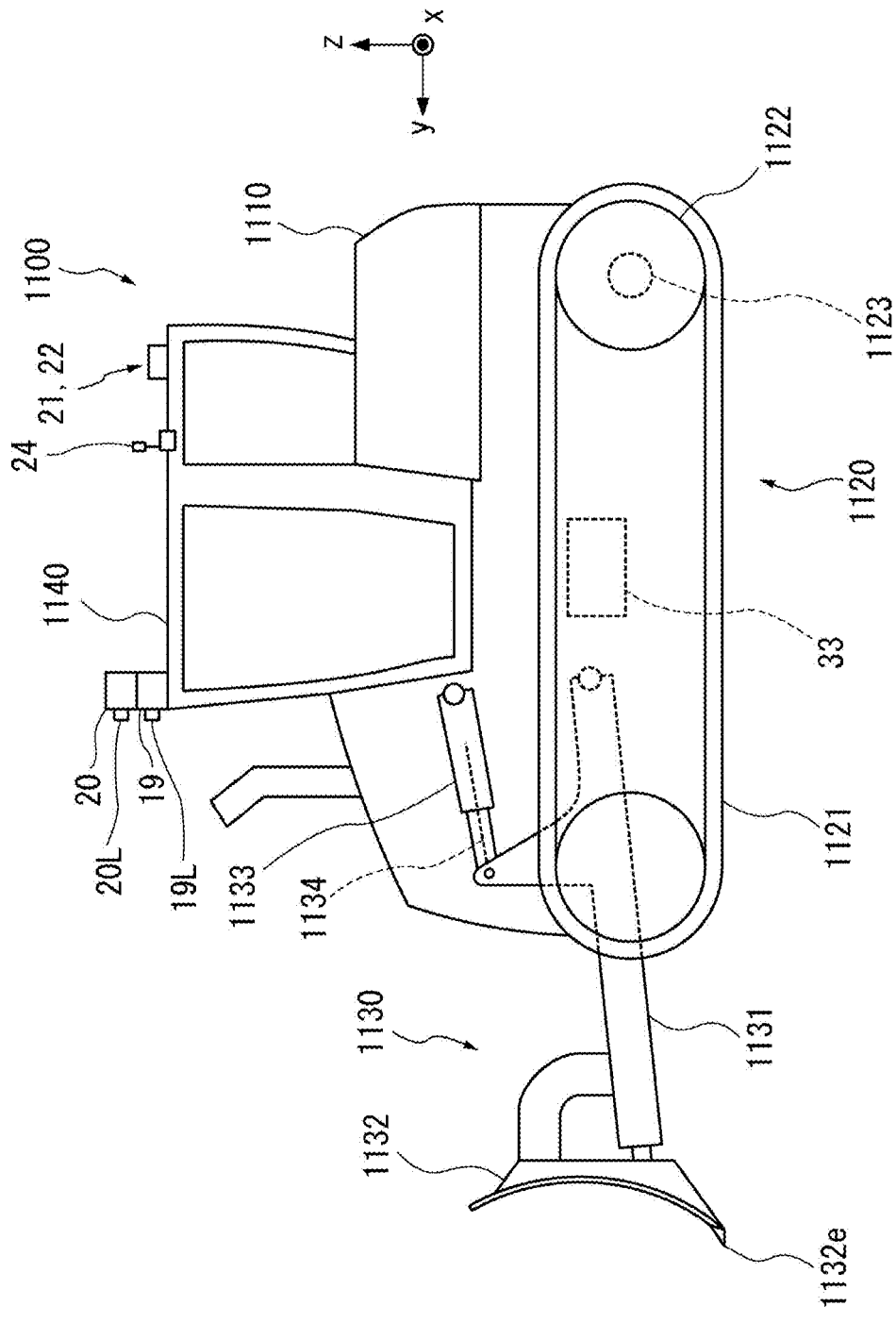
FIG. 2 is a side view schematically showing a bulldozer that is the work machine according to the embodiment.

FIG. 2 is a side view schematically showing the bulldozer 1100 that is the work machine according to the embodiment. The bulldozer 1100 includes a vehicle body 1110, the traveling device 1120, the work equipment 1130, and a cab 1140.

The traveling device 1120 is provided in a lower portion of the vehicle body 1110. The traveling device 1120 includes crawlers 1121, sprockets 1122, and the like. The sprockets 1122 are driven to rotate the crawlers 1121, and accordingly, the bulldozer 1100 travels. A rotation sensor 1123 is provided in a rotation axis of the sprocket 1122. The rotation sensor 1123 measures a rotation speed of the sprocket 122. The rotation speed of the sprocket 122 can be converted into a speed of the traveling device 1120.

An IMU 33 is provided in the vehicle body 1110. The IMU 33 measures inclination angles in a roll direction and a pitch direction of the vehicle body 1110 and an angle displacement in a yaw direction.

The work equipment 1130 is used for excavation and transport of an excavation target, such as earth. The work equipment 1130 is provided in a front portion of the vehicle body 1110. The work equipment 1130 includes a lift frame 1131, a blade 1132, and a lift cylinder 1133.

A proximal end portion of the lift frame 1131 is attached to a side surface of the vehicle body 1110 through a pin extending in a vehicle width direction. A distal end portion of the lift frame 1131 is attached to a back surface of the blade 1132 through a spherical joint. With this, the blade 1132 is supported to be movable in an up-down direction with respect to the vehicle body 1110. A blade edge 1132e is provided in a lower end portion of the blade 1132. The lift cylinder 1133 is a hydraulic cylinder. A proximal end portion of the lift cylinder 1133 is attached to a side surface of the vehicle body 1110. A distal end portion of the lift cylinder 1133 is attached to the lift frame 1131. The lift cylinder 1133 expands and contracts by hydraulic fluid, whereby the lift frame 1131 and the blade 1132 are driven in a lifting direction or a lowering direction.

The lift cylinder 1133 is provided with a stroke sensor 1134 that measures a stroke length of the lift cylinder 1133. The stroke length measured by the stroke sensor 1134 can be converted into a position of the blade edge 1132e with the vehicle body 1110 as a reference. Specifically, a rotation angle of the lift frame 1131 is calculated based on the stroke length of the lift cylinder 1133. Since the shapes of the lift frame 1131 and the blade 1132 are known, it is possible to specify the position of the blade edge 1132e of the blade 1132 from the rotation angle of the lift frame 1131. The bulldozer 1100 according to another embodiment may detect a rotation angle with other sensors, such as an encoder.

The cab 1140 is a space where the operator boards and performs an operation of the bulldozer 1100. The cab 1140 is provided in an upper portion of the vehicle body 1110.

The bulldozer 1100 may include a traveling device that includes tires instead of the crawlers 1121 and transmits drive power of an engine to the tires through a transmission to travel. The bulldozer 1100 may be, for example, a backhoe loader having a structure in which a traveling device having such tires is provided and work equipment is attached to a vehicle main body (main body portion). That is, the backhoe loader has the work equipment attached to the vehicle main body and includes the traveling device that configures a part of the vehicle main body.

In the vehicle body 1110, a side on which the work equipment 1130 is disposed is a front. A front-rear direction of the vehicle body 1110 is a y-direction. A left side facing the front is a left side of the vehicle body 1110, and a right side facing the front is a right side of the vehicle body 1110. A right-left direction of the vehicle body 1110 is also referred to as a width direction or an x-direction. In the bulldozer 1100, a side of the traveling device 1120 is a lower side with the vehicle body 1110 as a reference, and a side of the vehicle body 1110 is an upper side with the traveling device 1120 as a reference. An up-down direction of the vehicle body 1110 is a z-direction. In a case where the bulldozer 1100 is provided on a horizontal plane, the lower side is a vertical direction, that is, a gravity action direction side, and the upper side is a side opposite to the vertical direction.

The antennas 21 and 22 and the antenna 24 are attached to the upper portion of the vehicle body 1110. The antennas 21 and 22 are used to detect a current position of the bulldozer 1100. The antennas 21 and 22 are electrically connected to the global position calculation device 23 shown in FIG. 3. The global position calculation device 23 is a position detection device that detects a position of the bulldozer 1100. The global position calculation device 23 detects the current position of the bulldozer 1100 using Real Time Kinematic-Global Navigation Satellite Systems (RTK-GNSS). In the following description, the antennas 21 and 22 are appropriately referred to as GNSS antennas 21 and 22. Signals corresponding to GNSS radio waves received by the GNSS antennas 21 and 22 are input to the global position calculation device 23. The global position calculation device 23 obtains installation positions of the GNSS antennas 21 and 22 in a global coordinate system. An example of GNSS is a global positioning system (GPS), but GNSS is not limited thereto.

As shown in FIG. 2, it is preferable that the GNSS antennas 21 and 22 are provided both end positions separated in the right-left direction of the bulldozer 1100, that is, in the width direction on the vehicle body 1110. In the embodiment, the GNSS antennas 21 and 22 are attached to both sides in the width direction of the vehicle body 1110. The positions where the GNSS antennas 21 and 22 are attached to the vehicle body 1110 are not limited, and it is preferable that the GNSS antennas 21 and 22 are provided at positions separated as much as possible since the detection accuracy of the current position of the bulldozer 1100 is improved. It is preferable that the GNSS antennas 21 and 22 are provided at positions where a visual field of the operator is little obstructed.

Since the imaging device 19 images the work target WA shown in FIG. 1, and the distance detection device 20 obtains a distance between the distance detection device 20 (a predetermined position of the bulldozer 1100) and the work target WA, it is preferable to acquire information from the work target WA as wide as possible. For this reason, in the embodiment, the antenna 24, the imaging device 19, and the distance detection device 20 are provided above the cab 1140 of the vehicle body 1110. The places where the imaging device 19 and the distance detection device 20 are not limited to above the cab 1140. For example, the imaging device 19 and the distance detection device 20 may be provided inside and above the cab 1140.

The imaging device 19 has an imaging surface 19L facing the front of the vehicle body 1110. The distance detection device 20 has a detection surface 20L facing the front of the vehicle body 1110. In the embodiment, the imaging device 19 is a monocular camera including an image sensor, such as a charge coupled device (CCD) image sensor or a complementary metal oxide semiconductor (CMOS) image sensor.

In the embodiment, the distance detection device 20 is a three-dimensional laser range finder, a three-dimensional laser scanner, a three-dimensional distance sensor, or the like. The three-dimensional laser range finder or the like is also referred to as light detection and ranging (LiDAR) or the like, and is a sensor (scanning distance measurement sensor) that performs irradiation of laser beam emitting light in a pulse shape in a plurality of measurement directions over a given range while sequentially scanning the measurement directions, and measures a distance and an orientation based on a time until reflected scattered beam is returned and an irradiation direction. In the embodiment, the distance detection device 20 sequentially stores, updates, and outputs three-dimensional data indicating a measurement result of each measurement point (each reflection point) in every scanning cycle. The three-dimensional data output from the distance detection device 20 is point group data indicating a distance and an orientation to each measurement point or a three-dimensional coordinate value of each measurement point.

The imaging device 19 and the distance detection device 20 are not limited thereto. For example, a device that has a function of acquiring the image of the work target WA and a function of obtaining the distance to the work target WA may be used instead of the imaging device 19 and the distance detection device 20. Examples of such a device include a stereo camera. LiDAR is excellent in longer transmission distance and outdoor application.

<Control System of Bulldozer 1100>

Figure 3:
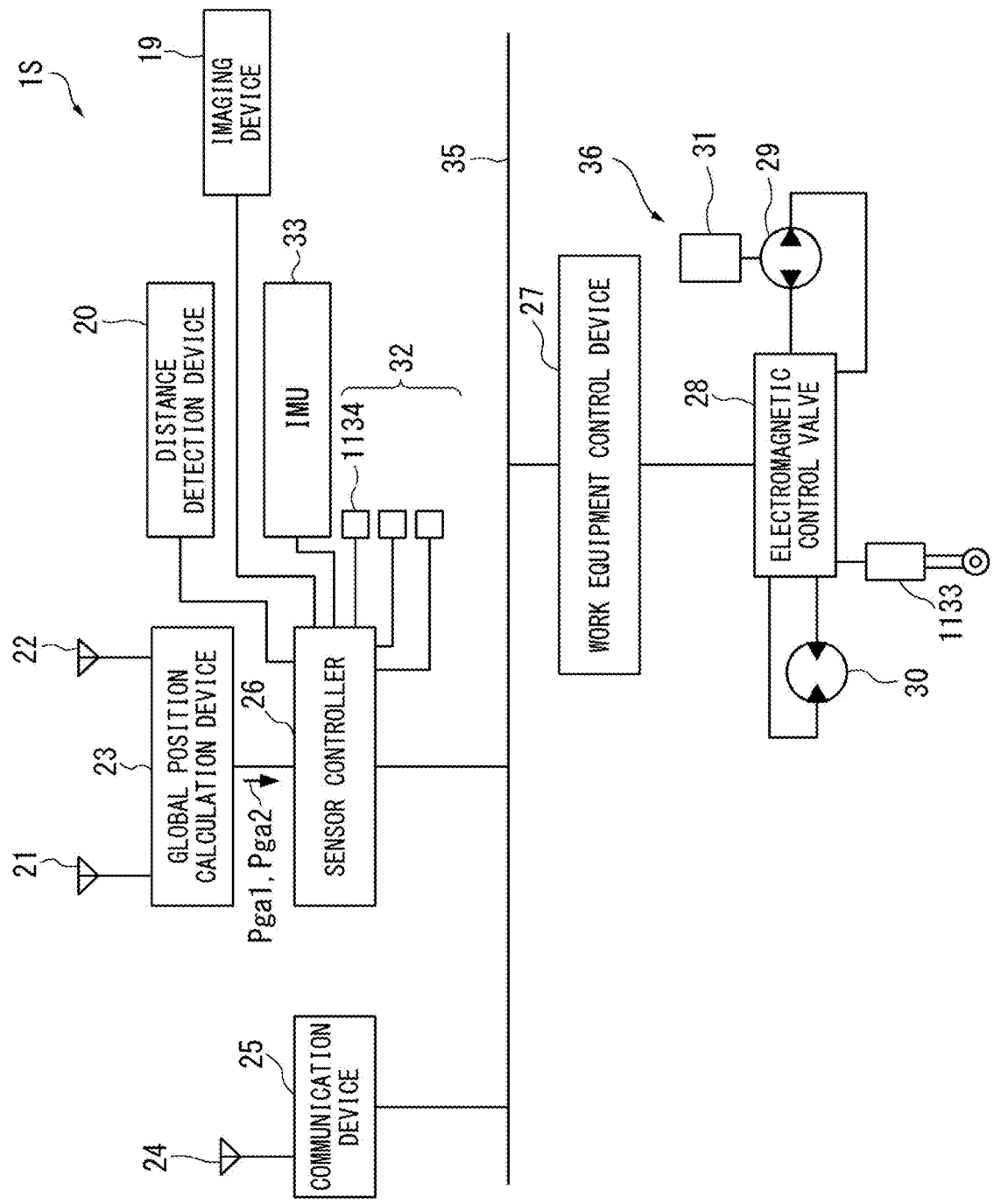
FIG. 3 is a diagram showing a control system of a bulldozer that is the work machine according to the embodiment.

FIG. 3 is a diagram showing a control system 1S of the bulldozer 1100 that is the work machine according to the embodiment. The control system 1S includes the communication device 25, a sensor controller 26, the work equipment control device 27, the imaging device 19, the distance detection device 20, the global position calculation device 23, the posture detection device 32, an inertial measurement unit (IMU) 33, and a hydraulic system 36. The communication device 25, the sensor controller 26, and the work equipment control device 27 are connected by a signal line 35. With such a structure, the communication device 25, the sensor controller 26, and the work equipment control device 27 can exchange information through the signal line 35. Examples of the signal line that transfers information in the control system 1S include an in-vehicle signal line, such as a controller area network (CAN).

The sensor controller 26 has a processor, such as a central processing unit (CPU), and a storage device, such as RAM and ROM. A detection value of the global position calculation device 23, information regarding an image captured by the imaging device 19, a detection value of the distance detection device 20, a detection value of the posture detection device 32, and a detection value of the IMU 33 are input to the sensor controller 26. The sensor controller 26 transmits the input detection values and information regarding the image to the processing device 51 of the facility 50 shown in FIG. 1 through the signal line 35 and the communication device 25.

The work equipment control device 27 has a processor, such as a CPU, and a storage device, such as a random access memory (RAM) and a read only memory (ROM). The work equipment control device 27 acquires a command for operating at least one of the work equipment 1130 and the vehicle body 1110 generated by the processing device 51 of the facility 50 through the communication device 25. The work equipment control device 27 controls an electromagnetic control valve 28 of the hydraulic system 36 based on the acquired command.

The hydraulic system 36 includes the electromagnetic control valve 28, a hydraulic pump 29, and hydraulic actuators, such as the lift cylinder 1133 and a traveling motor 30. The hydraulic pump 29 is driven by an engine 31 to discharge hydraulic fluid for operating the hydraulic actuators. The work equipment control device 27 controls a flow rate of the hydraulic fluid that is supplied to the lift cylinder 1133, by controlling the electromagnetic control valve 28. In this manner, the work equipment control device 27 controls the operations of the lift cylinder 1133 and the like.

The sensor controller 26 acquires detection values of the stroke sensor 1134 and the like. The stroke sensor 1134 is provided in the lift cylinder 1133. In a case where a lift cylinder length is decided, the posture of the work equipment 1130 is decided. Accordingly, the stroke sensor 1134 and the like that detect the lift cylinder length correspond to the posture detection device 32 that detects the posture of the work equipment 1130. The posture detection device 32 is not limited to the stroke sensor 1134 and the like and may be an angle detector.

The sensor controller 26 calculates a rotation angle of the lift frame 1131 in a direction (z-axis direction) perpendicular to the horizontal plane in a local coordinate system (vehicle body coordinate system) that is the coordinate system of the bulldozer 1100, from the lift cylinder length detected by the stroke sensor 1134. Since the shapes of the lift frame 1131 and the blade 1132 are known, the sensor controller 26 can specify the position of the blade edge 1132e of the blade 1132 from the rotation angle of the lift frame 1131. The sensor controller 26 calculates a rotation angle of the lift frame 1131 or an inclination angle of the blade 1132 from the lift cylinder length detected by the stroke sensor 1134. The rotation angle of the lift frame 1131 is information indicating the posture of the work equipment 1130. That is, the sensor controller 26 obtains information indicating the posture of the work equipment 1130. The sensor controller 26 transmits the calculated inclination angles to the processing device 51 of the facility 50 shown in FIG. 1 through the signal line 35 and the communication device 25.

The GNSS antenna 21 receives a position P1 indicating the position of the GNSS antenna 21 from the positioning satellites. The GNSS antenna 22 receives a position P2 indicating the position of the GNSS antenna 22 from the positioning satellites. The GNSS antennas 21 and 22 receive the positions P1 and P2 in a 10 Hz cycle, for example. The positions P1 and P2 are information regarding the positions that the GNSS antennas are provided, in the global coordinate system. Signals corresponding to GNSS radio waves received by the GNSS antennas 21 and 22, that is, the positions P1 and P2 are input to the global position calculation device 23. The GNSS antennas 21 and 22 output the positions P1 and P2 to the global position calculation device 23 each time the positions P1 and P2 are received.

The global position calculation device 23 has a processor, such as a CPU, and a storage device, such as a RAM and a ROM. The global position calculation device 23 detects the positions P1 and P2 of the GNSS antennas 21 and 22 in the global coordinate system at a frequency of, for example, 10 Hz and outputs the positions P1 and P2 as reference position information Pga1 and Pga2 to the sensor controller 26. In the embodiment, the global position calculation device 23 obtains a yaw angle that is an azimuth angle of the bulldozer 1100, and more specifically, an azimuth angle of the vehicle body 1110, from the acquired two positions P1 and P2 and outputs the yaw angle to the sensor controller 26. The sensor controller 26 transmits the acquired reference position information Pga1 and Pga2 and the yaw angle to the processing device 51 of the facility 50 shown in FIG. 1 through the signal line 35 and the communication device 25.

The IMU 33 detects an operation and a posture of the bulldozer 1100. The operation of the bulldozer 1100 includes at least one of an operation of the vehicle body 1110 and an operation of the traveling device 1120. The posture of the bulldozer 1100 can be represented by a roll angle, a pitch angle, and the yaw angle of the bulldozer 1100. In the embodiment, the IMU 33 detects and outputs an angular velocity and an acceleration of the bulldozer 1100.

<Functional Configuration Example of Processing Unit 51P>

Figure 4:
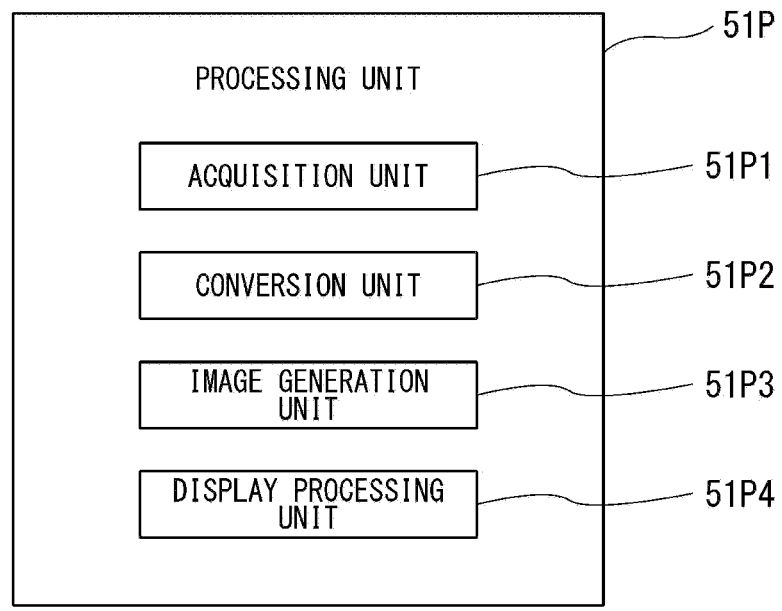
FIG. 4 is a block diagram showing a functional configuration example of a processing unit 51P shown in FIG. 1.

FIG. 4 is a block diagram showing a functional configuration example of the processing unit 51P shown in FIG. 1. As shown in FIG. 4, the processing unit 51P of the embodiment has, as functional elements configured with a combination of hardware and software, an acquisition unit 51P1, a conversion unit 51P2, an image generation unit 51P3, and a display processing unit 51P4. The acquisition unit 51P1 acquires three-dimensional data of a plurality of measurement points measured by the distance detection device 20 mounted in the bulldozer 1100 (work machine). The conversion unit 51P2 converts the three-dimensional data into a local coordinate system (vehicle body coordinate system) defined in association with the vehicle body 1110 of the bulldozer 1100. The image generation unit 51P3 generates a reference image representing a three-dimensional shape of a terrain based on the three-dimensional data converted into the local coordinate system. Then, the display processing unit 51P4 displays the reference image on the display device 52 to be superimposed on an image captured by the imaging device 19 (camera). In this case, the image generation unit 51P3 decides a display form of the reference image at a position of the reference image corresponding to each measurement point depending on the distance of the measurement point of the three-dimensional data in a normal direction with respect to a ground surface of the bulldozer 1100. Here, the ground surface is a surface with which the crawlers 1121 are in contact, at a site. The display form is, for example, coloring of the reference image, a thickness of a line or density of lines, or a line type (broken line, a chain line, and the like) in a case where the reference image includes a plurality of line images or a lattice image consisting of a plurality of line images, or the like. According to this configuration, since it is possible to change the display form of a target on which the work machine travels or performs work, depending on the distance in the normal direction with respect to the ground surface of the work machine, for example, it is possible to make a display form of ruggedness or the like present on a slope ground different from a display form of a periphery.

<Coordinate System>

Figure 5:
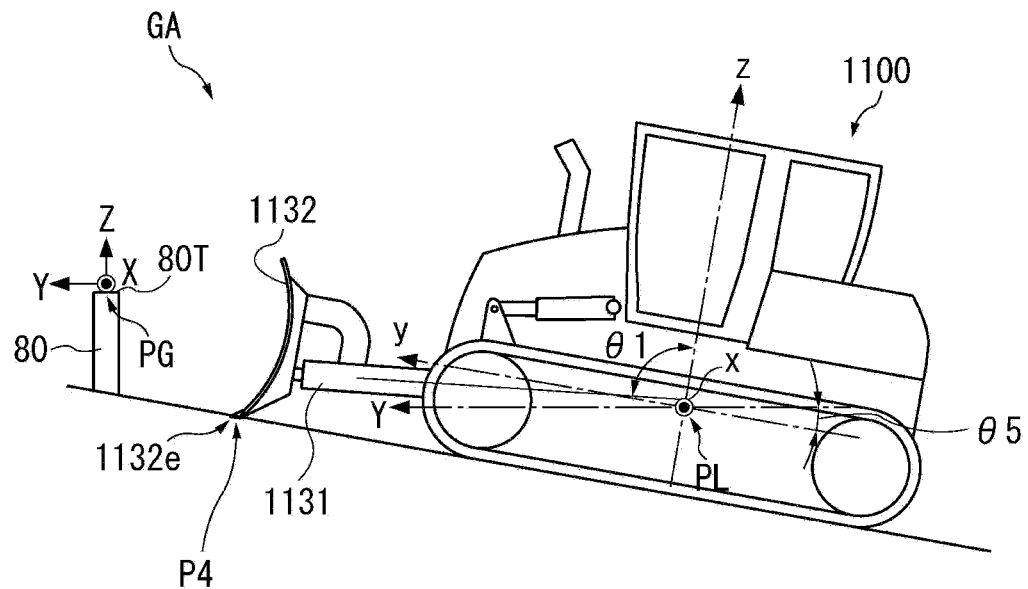
FIG. 5 is a diagram showing a coordinate system in the image display system and the remote operation system according to the embodiment.
Figure 6:
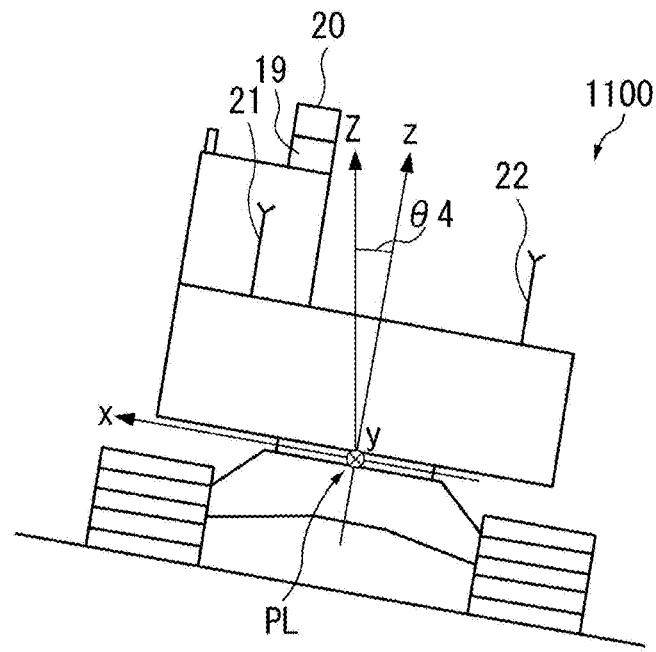
FIG. 6 is a rear view schematically showing the bulldozer.
Figure 7:
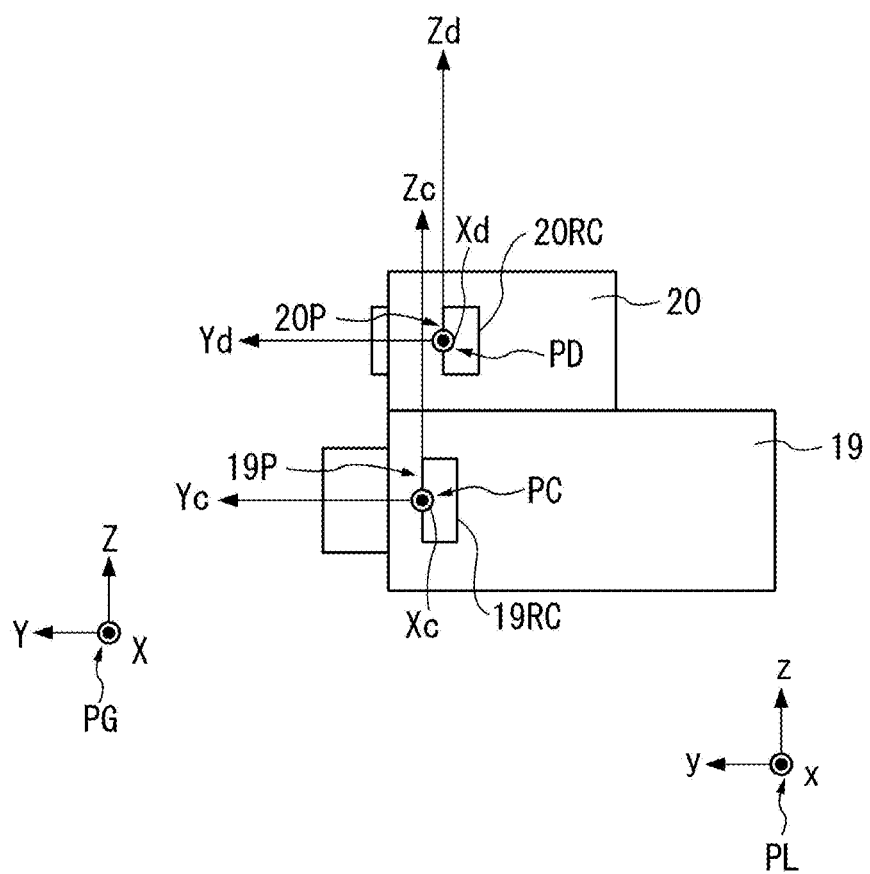
FIG. 7 is a diagram showing a coordinate system of an imaging device and a distance detection device.

FIG. 5 is a diagram showing a coordinate system in the image display system 100 and the remote operation system 101 according to the embodiment. FIG. 6 is a rear view schematically showing the bulldozer 1100. FIG. 7 is a diagram showing a coordinate system of the imaging device and the distance detection device. In the image display system 100 and the remote operation system 101, there are a global coordinate system, a local coordinate system, a coordinate system of the imaging device 19, and a coordinate system of the distance detection device 20. In the embodiment, the global coordinate system is, for example, a coordinate system in GNSS. The global coordinate system is a three-dimensional coordinate system indicated by (X, Y, Z) with, for example, a reference position PG of a reference pile 80 to be a reference provided in a work section GA of the bulldozer 1100 as a reference. As shown in FIG. 5, the reference position PG is positioned, for example, at a distal end 80T of the reference pile 80 provided in the work section GA.

The local coordinate system is a three-dimensional coordinate system indicated by (x, y, z) with the bulldozer 1100 as a reference. In the embodiment, an origin position PL of the local coordinate system is a predetermined position of the vehicle body 1110.

In the embodiment, as shown in FIG. 7, the coordinate system of the imaging device 19 is a three-dimensional coordinate system indicated by (Xc, Yc, Zc) with the center of a light receiving surface 19P of an imaging element 19RC as an origin PC. In the embodiment, as shown in FIG. 7, the coordinate system of the distance detection device 20 is a three-dimensional coordinate system indicated by (Xd, Yd, Zd) with the center of a light receiving surface 20P of a distance detection element 20RC as an origin PD.

<Posture of Bulldozer 1100>

As shown in FIG. 6, an inclination angle θ4 of the vehicle body 1110 with respect to the right-left direction, that is, the width direction is the roll angle of the bulldozer 1100, an inclination angle θ5 of the vehicle body 1110 with respect to the front-rear direction is the pitch angle of the bulldozer 1100, and an angle of the vehicle body 1110 around the z-axis is the yaw angle of the bulldozer 1100. The roll angle is obtained by integrating an angular velocity around the y-axis detected by the IMU 33 with a time, the pitch angle is obtained by integrating an angular velocity around the x-axis detected by the IMU 33 with a time, and the yaw angle is obtained by integrating an angular velocity around the z-axis detected by the IMU 33 with a time. The angular velocity around the z-axis is a swing angular velocity ω of the bulldozer 1100. That is, the yaw angle of the bulldozer 1100, and more specifically, the vehicle body 1110 is obtained by integrating the swing angular velocity ω with a time.

The acceleration and the angular velocity detected by the IMU 33 are output as operation information to the sensor controller 26. The sensor controller 26 executes processing, such as filter processing and integration, on the operation information acquired from the IMU 33 to obtain the inclination angle θ4 as the roll angle, the inclination angle θ5 as the pitch angle, and the yaw angle. The sensor controller 26 transmits the obtained inclination angle θ4, the inclination angle θ5, and the yaw angle as information related to the posture of the bulldozer 1100 to the processing device 51 of the facility 50 shown in FIG. 1 through the signal line 35 and the communication device 25 shown in FIG. 3.

As described above, the sensor controller 26 obtains information indicating the posture of the work equipment 1130. Specifically, information regarding the posture of the work equipment 1130 is an inclination angle θ1 of the lift frame 1131 with respect to a direction (z-axis direction) perpendicular to the horizontal plane in the local coordinate system, an inclination angle of the blade 1132, a position of the blade edge 1132e, or the like. The processing device 51 of the facility 50 shown in FIG. 1 calculates information indicating the posture of the work equipment 1130 acquired from the sensor controller 26 of the bulldozer 1100, that is, the inclination angle θ1 or the position (hereinafter, appropriately referred to as a blade edge position) P4 of the blade edge 1132e of the blade 1132.

The storage unit 51M of the processing device 51 stores data (hereinafter, appropriately referred to as work equipment data) of the work equipment 1130. The work equipment data includes data representing the shapes of the lift frame 1131 and the blade 1132, for example, with the origin position PL of the local coordinate system as a reference. The processing device 51 can obtain the blade edge position P4 with respect to the origin position PL using the work equipment data and the lift cylinder length detected by the stroke sensor 1134 or the inclination angle θ1 and the origin position PL. In the embodiment, although the processing device 51 of the facility 50 obtains the blade edge position P4, the sensor controller 26 of the bulldozer 1100 may obtain the blade edge position P4 and may transmit the blade edge position P4 to the processing device 51 of the facility 50.

<Control Example that is Executed by the Image Display System 100 and the Remote Operation System 101>

Figure 8:
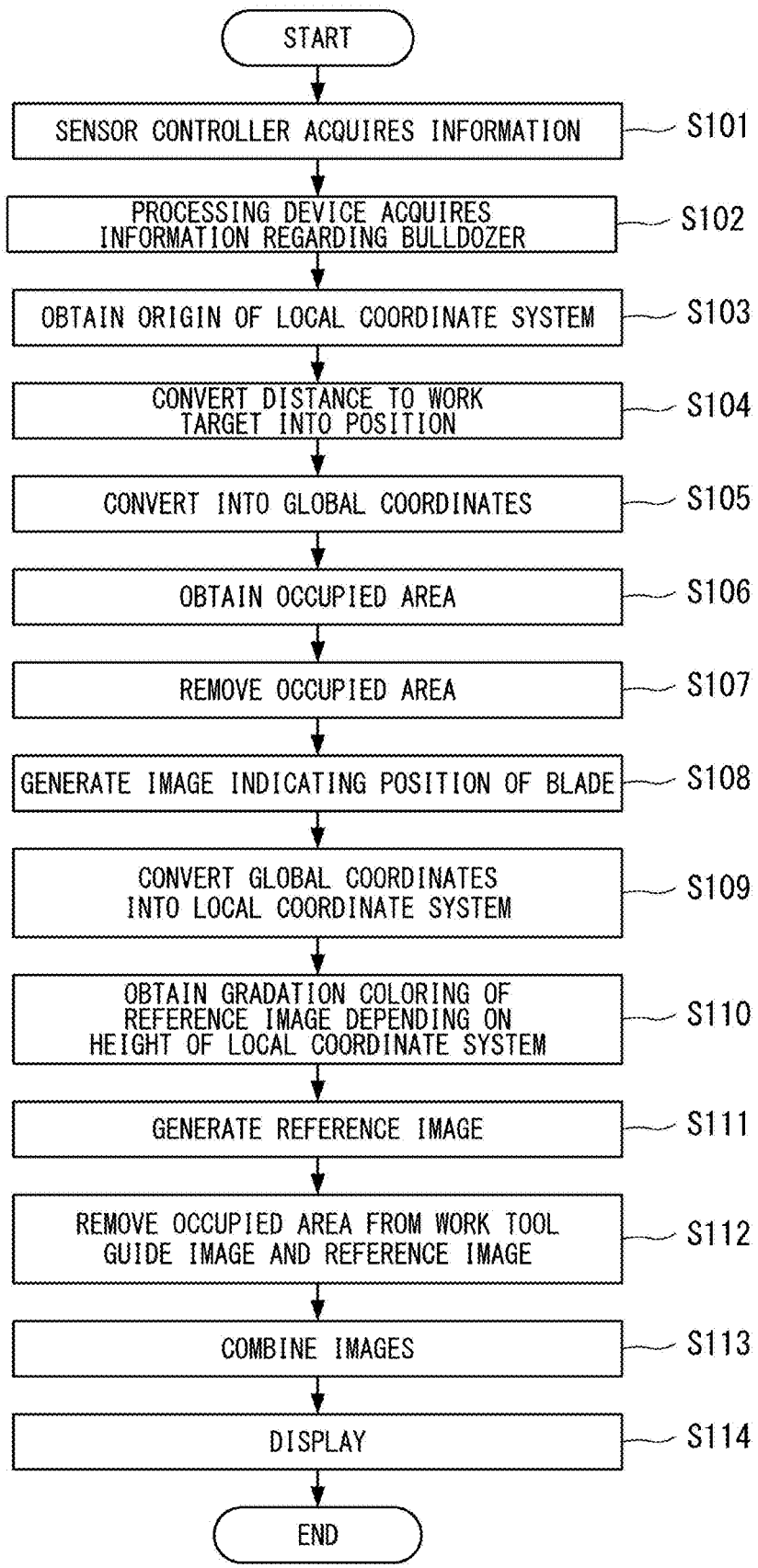
FIG. 8 is a flowchart of a control example that is executed by the image display system and the remote operation system.
Figure 11:
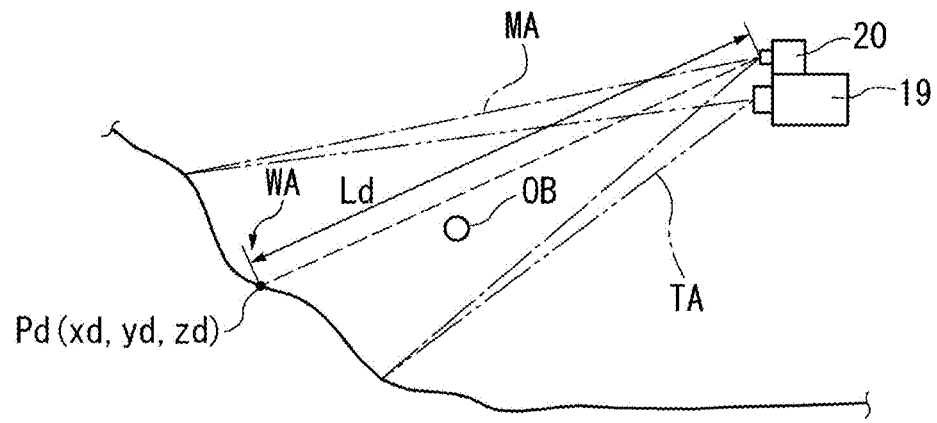
FIG. 11 is a diagram showing the imaging device, the distance detection device, and a work target.

FIG. 8 is a flowchart of a control example that is executed by the image display system 100 and the remote operation system 101. FIG. 11 is a diagram showing the imaging device 19, the distance detection device 20, and the work target WA.

In Step S101, the sensor controller 26 shown in FIG. 3 acquires information regarding the bulldozer 1100. Information regarding the bulldozer 1100 is information obtained from the imaging device 19, the distance detection device 20, the global position calculation device 23, the posture detection device 32, and the IMU 33. As shown in FIG. 11, the imaging device 19 images the work target WA within an imaging range TA and obtains an image of the work target WA. The distance detection device 20 detects a distance Ld between the distance detection device 20 and the work target WA and other objects within a detection range MA. The global position calculation device 23 obtains the reference position information Pga1 and Pga2 corresponding to the positions P1 and P2 of the GNSS antennas 21 and 22 in the global coordinate system. The posture detection device 32 detects the lift cylinder length and the like. The IMU 33 detects the posture of the bulldozer 1100, and more specifically, the roll angle θ4, the pitch angle θ5, and the yaw angle of the vehicle body 1110.

In Step S102, the image display system 100 and the processing device 51 of the remote operation system 101 acquires information regarding the bulldozer 1100 from the sensor controller 26 of the bulldozer 1100 through the communication device 25 of the bulldozer 1100 and the communication device 54 connected to the processing device 51, with the acquisition unit 51P1.

Information regarding the bulldozer 1100 that is acquired from the sensor controller 26 by the processing device 51 includes the image of the work target WA captured by the imaging device 19, information regarding the distance between the distance detection device 20 and the work target WA detected by the distance detection device 20, information regarding the posture of the work equipment 1130 provided in the bulldozer 1100 detected by the posture detection device 32, the reference position information Pga1 and Pga2, and information regarding the posture of the bulldozer 1100.

Information regarding the distance between the distance detection device 20 and the work target WA includes a distance Ld to the work target WA or an object OB within the detection range MA and information regarding an azimuth direction of a position Pd corresponding to the distance Ld. FIG. 11 shows the distance Ld as the distance to the work target WA. Information regarding the azimuth direction of the position Pd is an azimuth direction of the position Pd with the distance detection device 20 as a reference, and angles with respect to the axes Xd, Yd, and Zd of the coordinate system of the distance detection device 20. Information regarding the posture of the work equipment 1130 that is acquired by the processing device 51 is the inclination angle θ1 of the work equipment 1130 obtained by the sensor controller 26 using the lift cylinder length and the like. Information regarding the posture of the bulldozer 1100 is the roll angle θ4, the pitch angle θ5, and the yaw angle of the bulldozer 1100, and more specifically, the vehicle body 1110.

The processing device 51 obtains the blade edge position P4 of the blade 1132 using the inclination angle θ1 of the work equipment 1130 acquired from the sensor controller 26 and the lift cylinder length and the like stored in the storage unit 51M, for example, with the conversion unit 51P2. The blade edge position P4 of the blade 1132 is a set of coordinates in the local coordinate system (x, y, z) of the bulldozer 1100.

The process progresses to Step S103, and the processing device 51 obtains the origin of the local coordinate system with the conversion unit 51P2.

The process progresses to Step S104, and the processing device 51 converts the distance Ld to the work target WA into information regarding a position using information regarding the distance to the work target WA, with the conversion unit 51P2. Information regarding the position is the coordinates of the position Pd in the coordinate system (Xd, Yd, Zd) of the distance detection device 20. In Step S104, all distances Ld detected by the distance detection device 20 within the detection range MA are converted into information regarding the position. The processing device 51 converts the distance Ld into information regarding the position using the distance Ld and information regarding the azimuth direction of the position Pd corresponding to the distance Ld, with the conversion unit 51P2. In Step S104, the distance to the object OB within the detection range MA is also converted into information regarding the position similarly to the distance Ld of the work target WA. Through the processing of Step S104, information regarding the position of the work target WA within the detection range MA is obtained. It is possible to obtain information regarding a shape of the work target WA from information regarding the position of the work target WA.

Information regarding the position and the shape of the work target WA is a set of coordinates of the position Pd in the coordinate system (Xd, Yd, Zd) of the distance detection device 20. The processing device 51 converts information regarding the shape of the work target WA into a value of the coordinate system (Xc, Yc, Zc) of the imaging device 19, and then, converts the converted value into a value of the local coordinate system (x, y, z) of the bulldozer 1100, with the conversion unit 51P2.

In Step S105, processing device 51 converts information regarding the position of the work target WA, the blade edge position P4 of the blade 1132, and the reference position information Pga1 and Pga2 acquired from the sensor controller 26 of the bulldozer 1100 into the global coordinate system (X, Y, Z), with the conversion unit 51P2. In the conversion into the global coordinate system (X, Y, Z), the processing device 51 generates a rotation matrix using the roll angle θ4, the pitch angle θ5, and the yaw angle of the bulldozer 1100 acquired from the sensor controller 26, with the conversion unit 51P2. The processing device 51 converts information regarding the position of the work target WA, the blade edge position P4 of the blade 1132, and the reference position information Pga1 and Pga2 into the global coordinate system (X, Y, Z) using the generated rotation matrix, with the conversion unit 51P2. Next, the process progresses to Step S106, and the processing device 51 obtains an occupied area with the image generation unit 51P3 (or the conversion unit 51P2).

Figure 12:
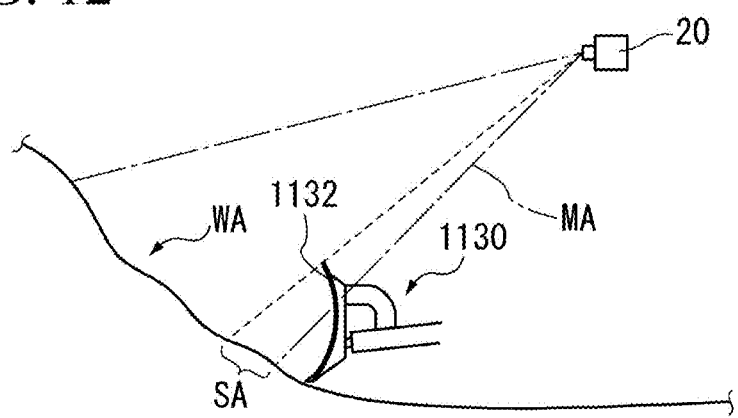
FIG. 12 is a diagram showing an occupied area.

FIG. 12 is a diagram showing an occupied area SA. The occupied area SA is an area occupied by the work equipment 1130 within information regarding the shape of the work target WA. In an example shown in FIG. 12, a part of the blade 1132 of the work equipment 1130 enters within the detection range MA of the distance detection device 20 and between the distance detection device 20 and the work target WA. For this reason, in the portion of the occupied area SA, the distance detection device 20 detects a distance to the blade 1132, instead of the distance to the work target WA. In the embodiment, the processing device 51 removes the portion of the occupied area SA from information regarding the shape of the work target WA obtained in Step S104, with the image generation unit 51P3.

The processing device 51 stores information regarding at least one of the position and the posture detected by the distance detection device 20 corresponding to at least one of the position and the posture of blade 1132 in, for example, the storage unit 51M, with the image generation unit 51P3. Such information is included in the posture of the work equipment 1130 of the bulldozer 1100 in the embodiment. The posture of the work equipment 1130 can be obtained using the inclination angle θ1 of the work equipment 1130, the lift cylinder length and the like, and the posture of the bulldozer 1100 as needed. Then, the processing device 51 compares data detected by the distance detection device 20 with information stored in the storage unit 51M and can determine that the blade 1132 is detected in a case where both match, with the image generation unit 51P3. Through such processing using the posture of the work equipment 1130, since the processing device 51 does not use information regarding the blade 1132 in the occupied area SA in generating the lattice image 65 shown in FIG. 1, the processing device 51 can accurately generate the lattice image 65.

To remove the portion of the occupied area SA, the processing using the posture of the work equipment 1130 may be executed by the following method. Information regarding at least one of the position and the posture in the global coordinate system of the blade 1132 included in the posture of the work equipment 1130 is obtained from the inclination angle θ1 of the work equipment 1130 and the lift cylinder length and the like. In Steps S104 and S105, information regarding the shape of the work target WA in the global coordinate system is obtained. In Step S107, the processing device 51 removes an area where the position of blade 1132 is projected onto information regarding the shape of the work target WA, as the occupied area SA from the shape of the work target WA, with the image generation unit 51P3.

Figure 13:
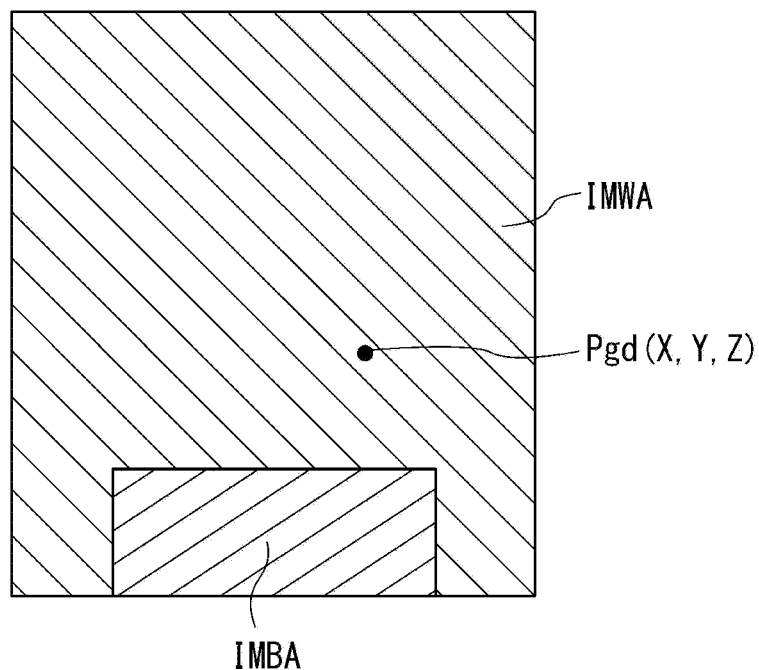
FIG. 13 is a diagram showing information regarding a shape of the work target with an occupied area removed.

FIG. 13 is a diagram showing information regarding the shape of the work target WA with the occupied area removed. Information IMWA regarding the shape of the work target WA is a set of coordinates Pgd (X, Y, Z) in the global coordinate system (X, Y, Z). There is no information of coordinates of the occupied area IMBA through the processing of Step S107. Next, the process progresses to Step S108, and the processing device 51 generates an image indicating the position of blade 1132 with the image generation unit 51P3. The image indicating the position of the blade 1132 is an image of a portion corresponding to the blade 1132 on the work target WA.

Figure 14:
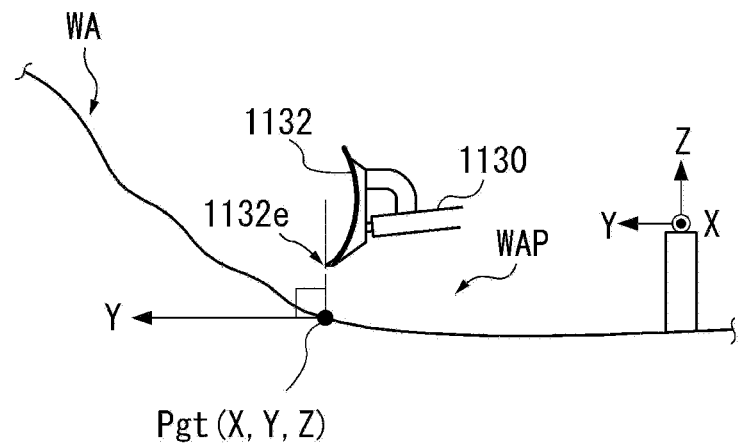
FIG. 14 is a diagram showing an image indicating a position of a blade on the work target.
Figure 15:
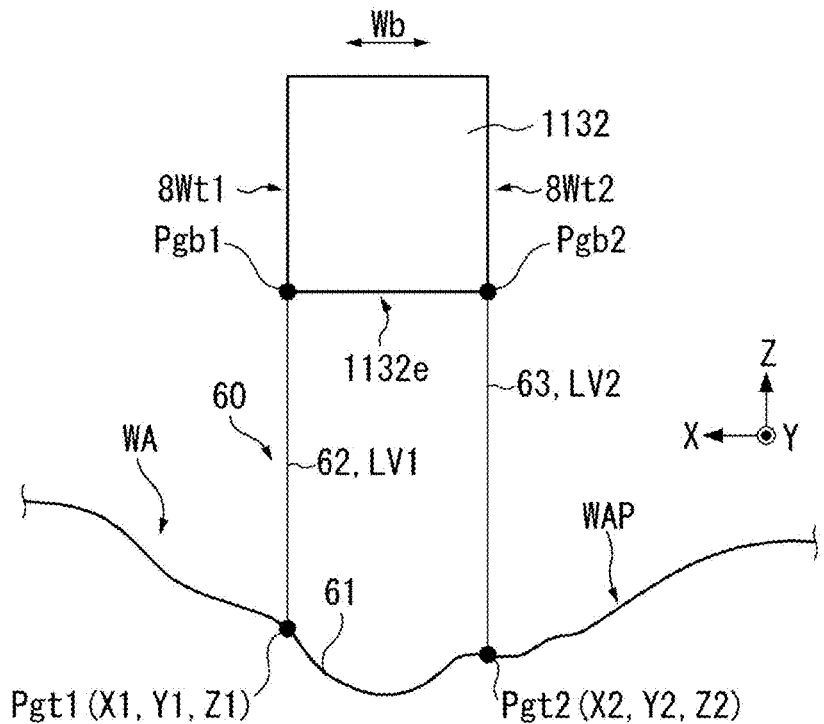
FIG. 15 is a diagram showing an image indicating the position of the blade on the work target.
Figure 16:
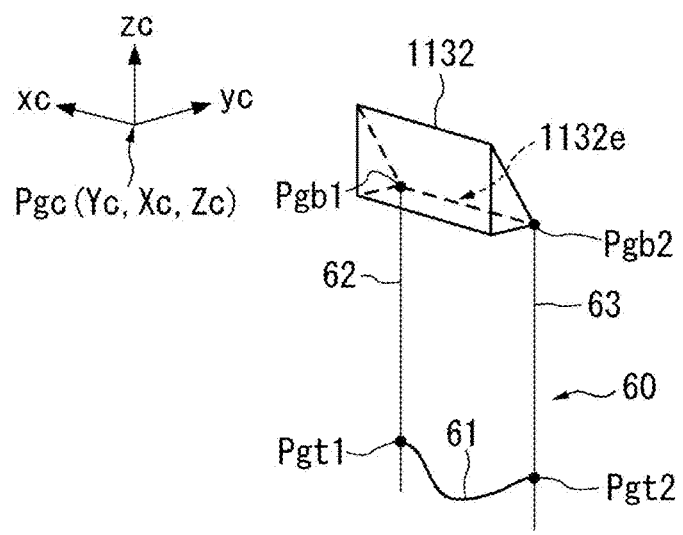
FIG. 16 is a diagram showing an image indicating the position of the blade on the work target.

FIGS. 14 to 16 are diagrams showing an image indicating the position of blade 1132 on the work target WA. In the embodiment, the image indicating the position of blade 1132 is an image indicating the position of the blade edge 1132e of the blade 1132 on the work target WA. Hereinafter, the image indicating the position of the blade edge 1132e of the blade 1132 is appropriately referred to as a blade edge position image. As shown in FIG. 14, the blade edge position image is an image that is defined by a position Pgt (X, Y, Z) of a surface WAP of the work target WA when the blade edge 1132e is projected onto the work target WA in a vertical direction, that is, a direction in which gravity acts. The vertical direction is the Z-direction in the global coordinate system (X, Y, Z) and is a direction perpendicular to the X-direction and the Y-direction.

As shown in FIG. 15, a line image that is formed along the surface WAP of the work target WA between a first position Pgt1 (X1, Y1, Z1) and a second position Pgt2 (X2, Y2, Z2) of the surface WAP of the work target WA is a blade edge position image 61. The first position Pgt1 (X1, Y1, Z1) is an intersection between a straight line LV1 extending in the vertical direction from a position Pgb1 outside the blade edge 1132e on one end portion 8Wt1 side of the blade 1132 in a width direction Wb and the surface WAP of the work target WA. The second position Pgt2 (X2, Y2, Z2) is an intersection between a straight line LV2 extending in the vertical direction from a position Pgb2 outside the blade edge 1132e on the other end portion 8Wt2 side of the blade 1132 in the width direction Wb and the surface WAP of the work target WA.

The processing device 51 obtains the straight line V1 and the straight line LV2 extending in the vertical direction from the position Pgb1 and the position Pgb2 of the blade 1132, with the image generation unit 51P3. Next, the processing device 51 obtains the first position Pgt1 (X1, Y1, Z1) and the second position Pgt2 (X2, Y2, Z2) from the obtained straight line LV1 and straight line LV2 and information regarding the shape of the work target WA with the image generation unit 51P3. Then, the processing device 51 defines a set of positions Pgt of the surface WAP when a straight line connecting the first position Pgt1 and the second position Pgt2 is projected onto the surface WAP of the work target WA, as the blade edge position image 61 with the image generation unit 51P3.

In the embodiment, the processing device 51 generates a first straight line image 62 that is an image of the straight line LV1 connecting the position Pgb1 and the first position Pgt1 (X1, Y1, Z1) and a second straight line image 63 that is an image of the straight line LV2 connecting the position Pgb2 and the second position Pgt2 (X2, Y2, Z2), with the image generation unit 51P3. Next, the processing device 51 converts the blade edge position image 61, the first straight line image 62, and the second straight line image 63 into an image with the imaging device 19 as a reference, that is, an image viewed from the imaging device 19, with the image generation unit 51P3.

As shown in FIG. 16, the image viewed from the imaging device 19 is an image as the blade edge position image 61, the first straight line image 62, and the second straight line image 63 are viewed from the origin Pgc (Xc, Yc, Zc) of the imaging device in the global coordinate system (X, Y, Z). The origin Pgc (Xc, Yc, Zc) of the imaging device is coordinates obtained by converting the center of the light receiving surface 19P of the imaging element 19RC provided in the imaging device 19, that is, the origin PC into the global coordinate system (X, Y, Z).

While the blade edge position image 61, the first straight line image 62, and the second straight line image 63 are images in a three-dimensional space, and the image viewed from the imaging device 19 is a two-dimensional image.

Accordingly, the processing device 51 executes perspective projection conversion to project the blade edge position image 61, the first straight line image 62, and the second straight line image 63 defined in the three-dimensional space, that is, in the global coordinate system (X, Y, Z) onto a two-dimensional plane, with the image generation unit 51P3. Hereinafter, the blade edge position image 61, the first straight line image 62, and the second straight line image 63 converted into the image viewed from the imaging device 19 are appropriately referred to as a work tool guide image 60.

The process progresses to Step S109, and the processing device 51 converts the global coordinates into the local coordinate system with the image generation unit 51P3.

The process progresses to Step S110, and the processing device 51 obtains gradation coloring of the reference image depending on the height of the local coordinate system with the image generation unit 51P3. In Step S110, the image generation unit 51P3 decides gradation coloring of the reference image at a position of the reference image corresponding to each measurement point depending on a distance of the measurement point of the three-dimensional data in a normal direction with respect to the ground surface of the bulldozer 1100. For example, the image generation unit 51P3 sets the coloring of the reference image to a cold color at a position corresponding to a comparatively low measurement point, sets the coloring of the reference image to a warm color at a position corresponding to a comparatively high measurement point, and sets the coloring of the reference image to a neutral color at a position corresponding to a measurement point having an intermediate height.

Figure 9:
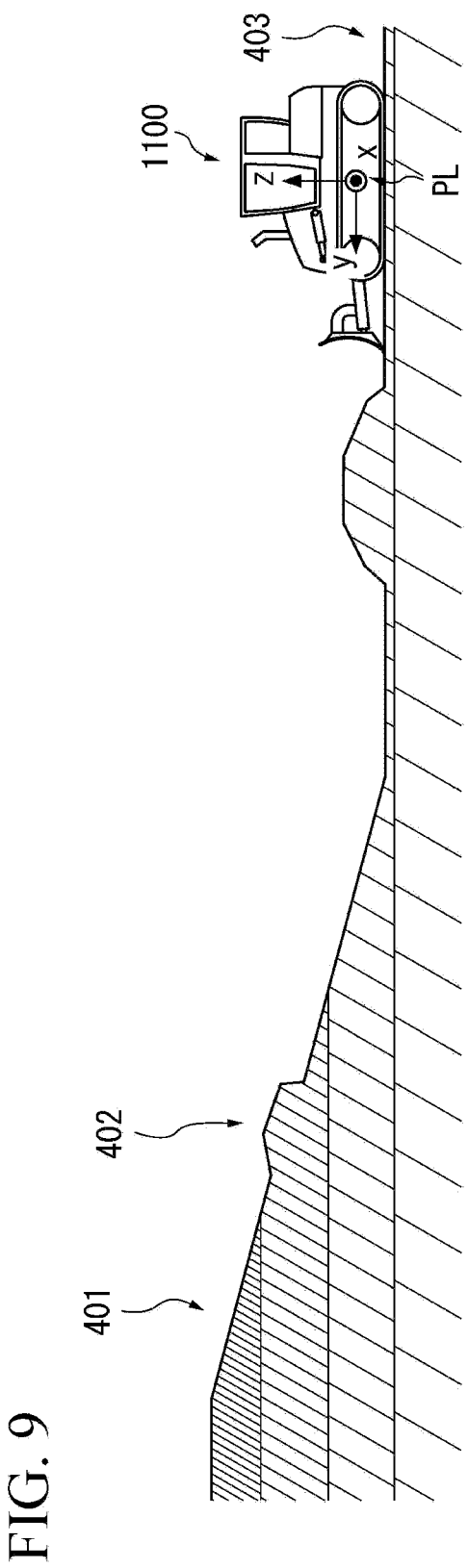
FIG. 9 is a diagram showing processing shown in FIG. 8.
Figure 21:
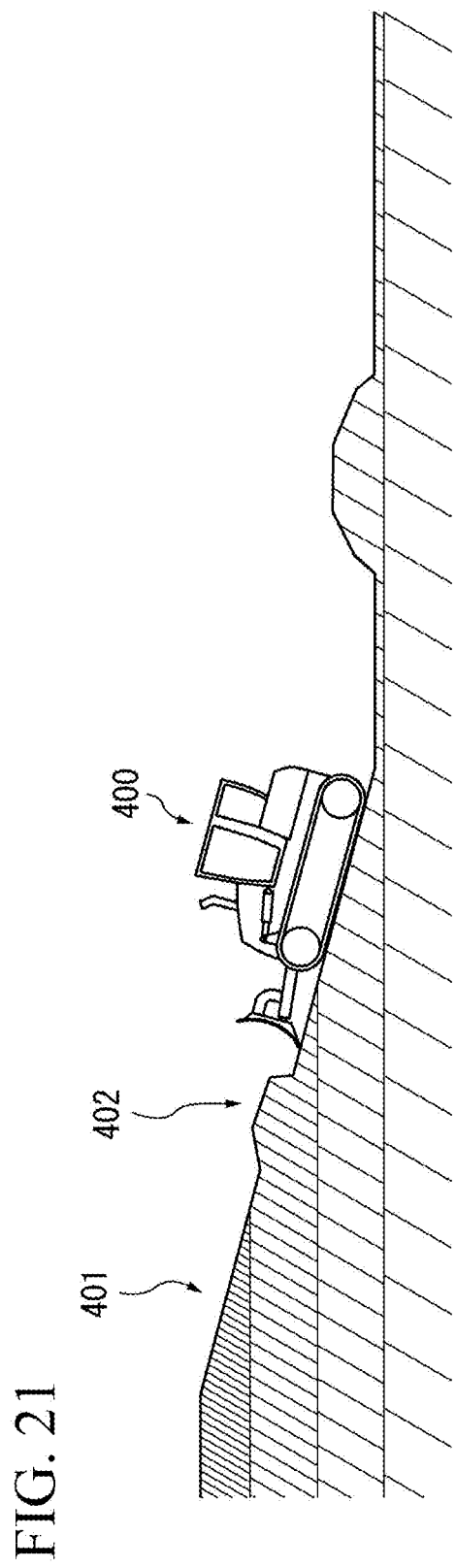
FIG. 21 is a diagram showing a problem to be solved by the invention.

For example, as shown in FIG. 9, in a case where the ground surface of the bulldozer 1100 is a level ground 403, the processing device 51 obtains the gradation coloring of the reference image depending on the height in the z-direction (in this case, the vertical direction) of the local coordinate system, with the image generation unit 51P3. In an example shown in FIG. 9, the processing device 51 obtains the gradation coloring of the reference image with the image generation unit 51P3 in the same manner as in a case where the change in color is decided with reference to the horizontal plane described referring to FIG. 21. FIG. 9 is a schematic view showing change in coloring with change in density of hatching.

Figure 10:
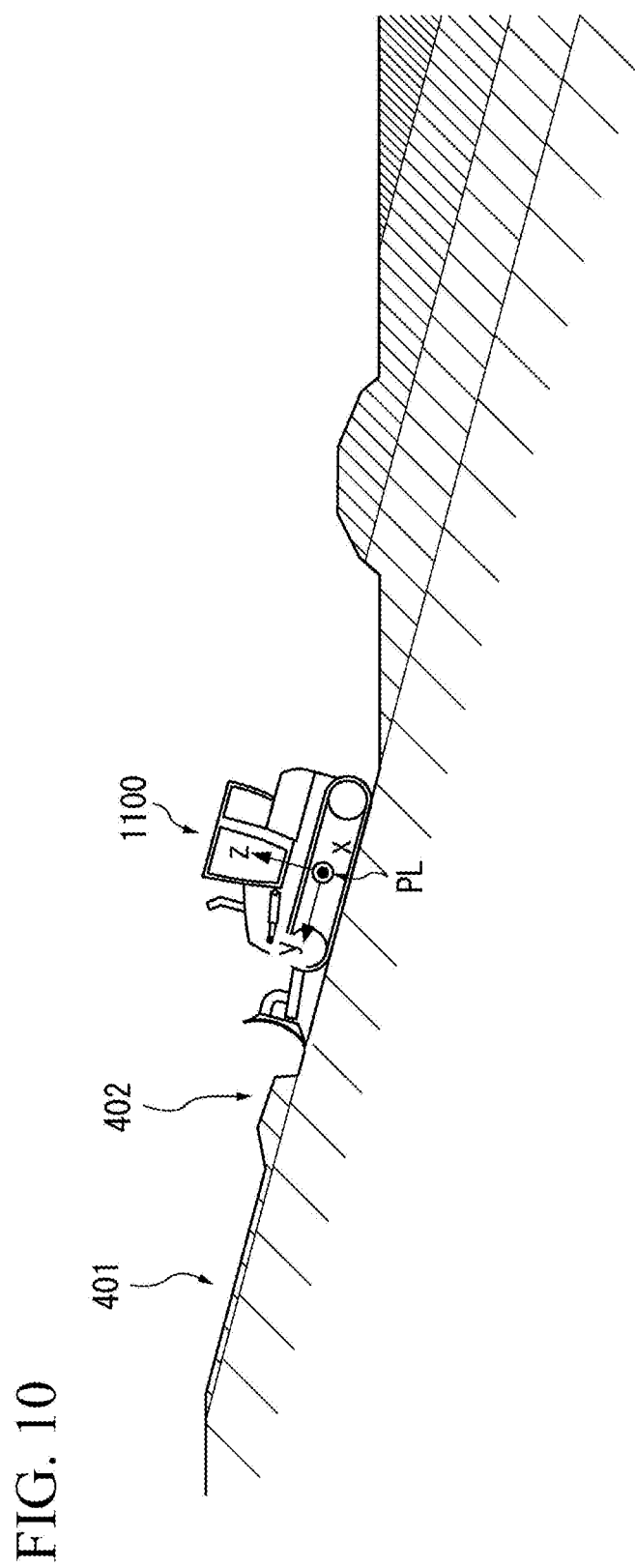
FIG. 10 is a diagram showing the processing shown in FIG. 8.

For example, as shown in FIG. 10, in a case where the ground surface of the bulldozer 1100 is a slope ground 401, the processing device 51 obtains the gradation coloring of the reference image depending on the height in the z-direction (in this case, a direction perpendicular to a slope surface of the slope ground 401) of the local coordinate system, with the image generation unit 51P3. In an example shown in FIG. 10, the processing device 51 obtains the gradation coloring of the reference image with the image generation unit 51P3 unlike a case where the change in color is decided with reference to the horizontal plane described referring to FIG. 21. FIG. 10 is a schematic view showing change in coloring with change in density of hatching. In this case, it is possible to set coloring different from the periphery for the ruggedness 402 on the slope ground 401 not color-coded in FIG. 21.

Figure 17:
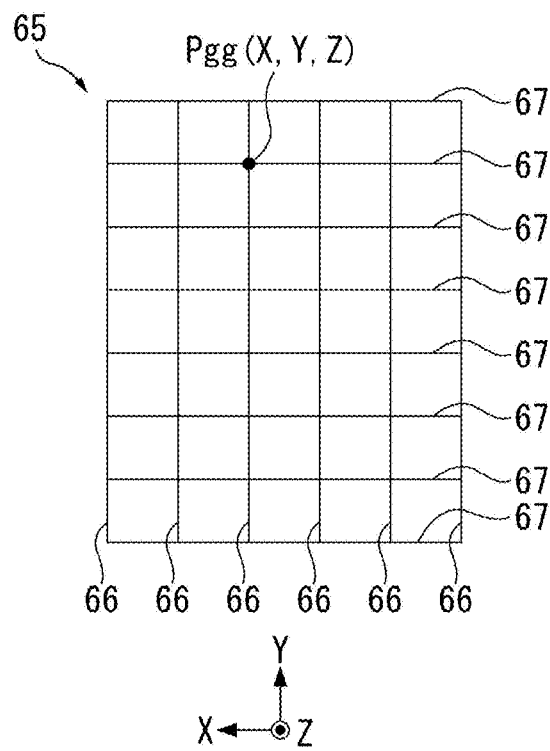
FIG. 17 is a diagram showing a lattice image that is a reference image.
Figure 18:
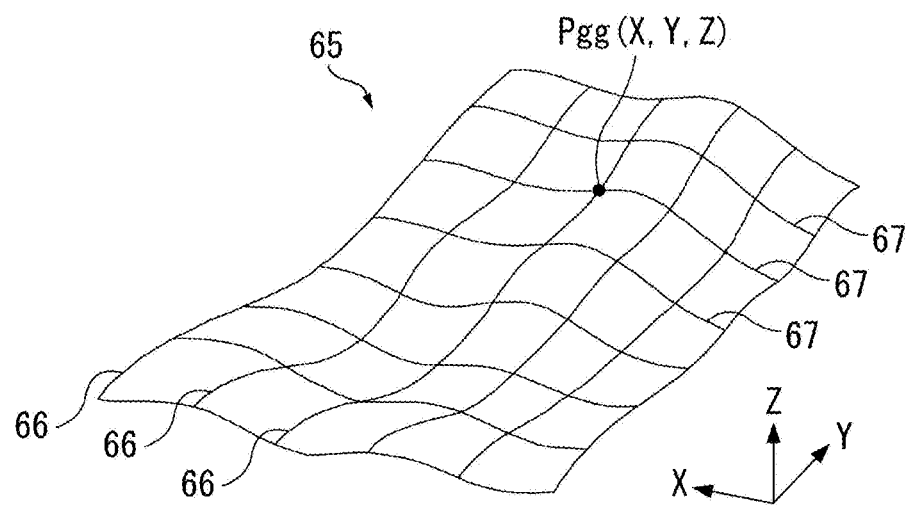
FIG. 18 is a diagram showing the lattice image as a reference image.

FIGS. 17 and 18 are diagrams showing the lattice image 65 as a reference image. In a case where the gradation coloring of the reference image is decided in Step S110, the process progresses to Step S111, and the processing device 51 generates the lattice image 65 as the reference image with the gradation coloring decided in Step S110, with the image generation unit 51P3. The lattice image 65 is a line image along the surface WAP of the work target WA using information regarding the position of the work target WA. The lattice image 65 is a lattice including a plurality of first line images 66 and a plurality of second line images 67 intersecting a plurality of first line images 66. In the embodiment, the first line image 66 is, for example, a line image that extends in parallel with the X-direction in the global coordinate system (X, Y, Z) and is disposed in the Y-direction. In the global coordinate system (X, Y, Z), the first line image 66 may be a line image that extends in parallel with the front-rear direction of the vehicle body 1110 provided in the bulldozer 1100 and is disposed in the width direction of the vehicle body 1110.

The lattice image 65 is generated using information regarding the position of the work target WA, and more specifically, a position Pgg (X, Y, Z) of the surface WAP. An intersection of the first line image 66 and the second line image 67 is the position Pgg (X, Y, Z). As shown in FIG. 18, the first line image 66 and the second line image 67 are defined by the global coordinate system (X, Y, Z), and thus, include three-dimensional information. In the embodiment, a plurality of first line images 66 are disposed at equal intervals, and a plurality of second line images 67 are disposed at equal intervals. An interval between adjacent first line images 66 is equal to an interval between adjacent second line images 67.

The lattice image 65 is an image obtained by converting the first line image 66 and the second line image 67 generated using the position Pgg (X, Y, Z) of the surface WAP into the image viewed from the imaging device 19. The processing device 51 generates the first line image 66 and the second line image 67, and then, converts these images into the image viewed from the imaging device 19 to generate the lattice image 65, with the image generation unit 51P3. The first line image 66 and the second line image 67 are converted into the image viewed from the imaging device 19, whereby the lattice image 65 having an equal interval on the horizontal plane can be deformed and displayed in conformity with the shape of the work target WA to assist an absolute distance of the work target WA.

Next, in Step S112, the processing device 51 removes the above-described occupied area SA from the generated work tool guide image 60 and the lattice image 65 that is the reference image, with the display processing unit 51P4. In Step S112, the processing device 51 converts the occupied area SA into the image viewed from the imaging device 19 and removes the work tool guide image 60 and the lattice image 65 that is the reference image, with the display processing unit 51P4. In the embodiment, the processing device 51 may remove the occupied area SA before being converted into the image viewed from the imaging device 19, from the blade edge position image 61, the first straight line image 62, and the second straight line image 63 before being converted into the image viewed from the imaging device 19, and the first line image 66 and the second line image 67 before being converted into the image viewed from the imaging device 19, with the display processing unit 51P4.

Figure 19:
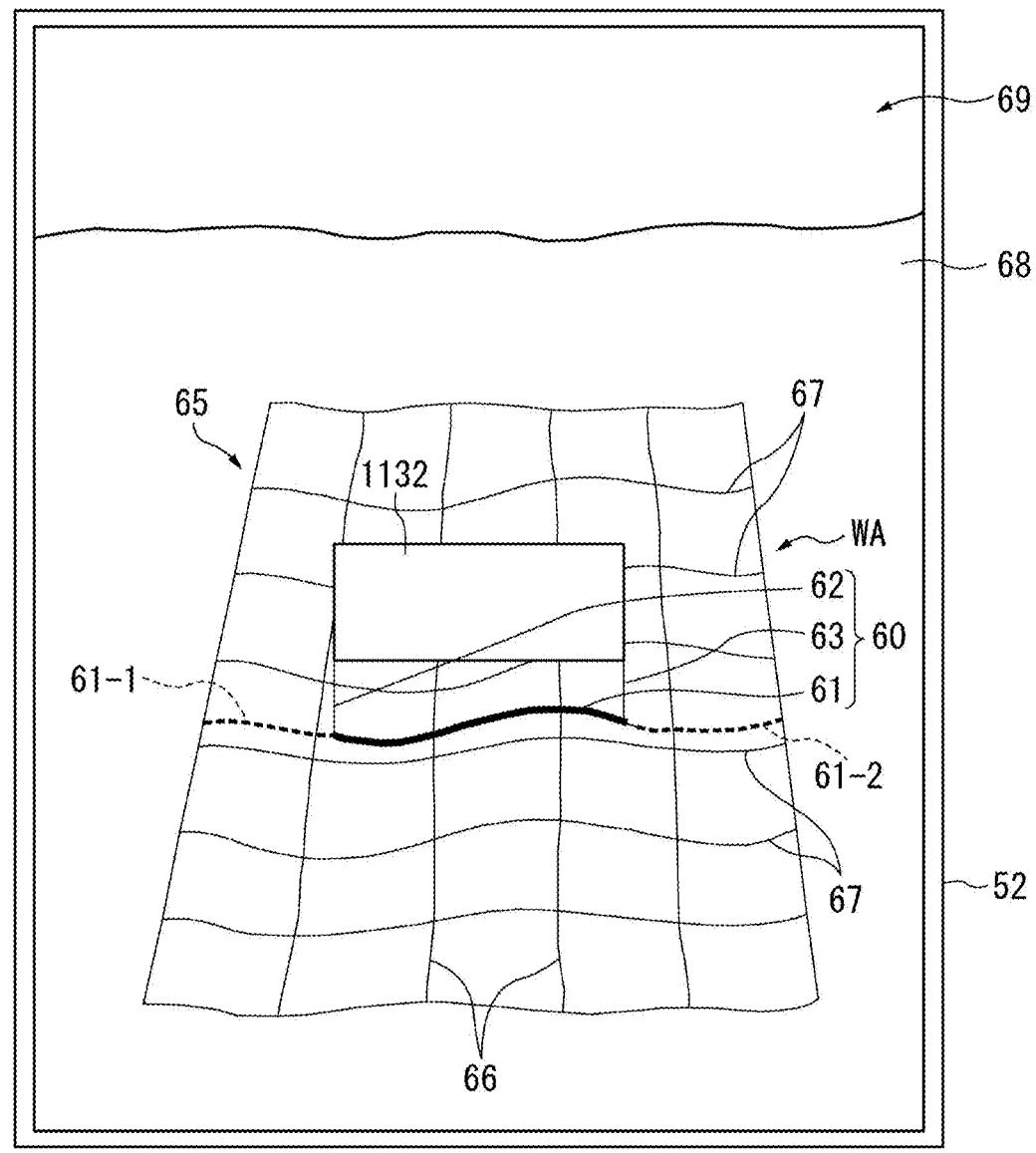
FIG. 19 is a diagram showing an image for work.

FIG. 19 is a diagram showing an image 69 for work. In Step S113, the processing device 51 combines the work tool guide image 60 with the occupied area SA removed, the lattice image 65, and the image 68 of the work target WA captured by the imaging device 19 to generate the image 69 for work, with the display processing unit 51P4. In Step S114, the processing device 51 displays the generated image 69 for work on the display device 52, with the display processing unit 51P4. The image 69 for work is an image in which the lattice image 65 and the work tool guide image 60 are displayed on the image 68 of the work target WA.

Since the lattice image 65 has a lattice along the surface WAP of the work target WA, the operator of the bulldozer 1100 can recognize the position of the work target WA by referring to the lattice image 65. For example, the operator can recognize a depth, that is, the position of the vehicle body 1110 provided in the bulldozer 1100 in the front-rear direction with the second line image 67 and can recognize the position of the blade 1132 in the width direction with the first line image 66.

Figure 20:
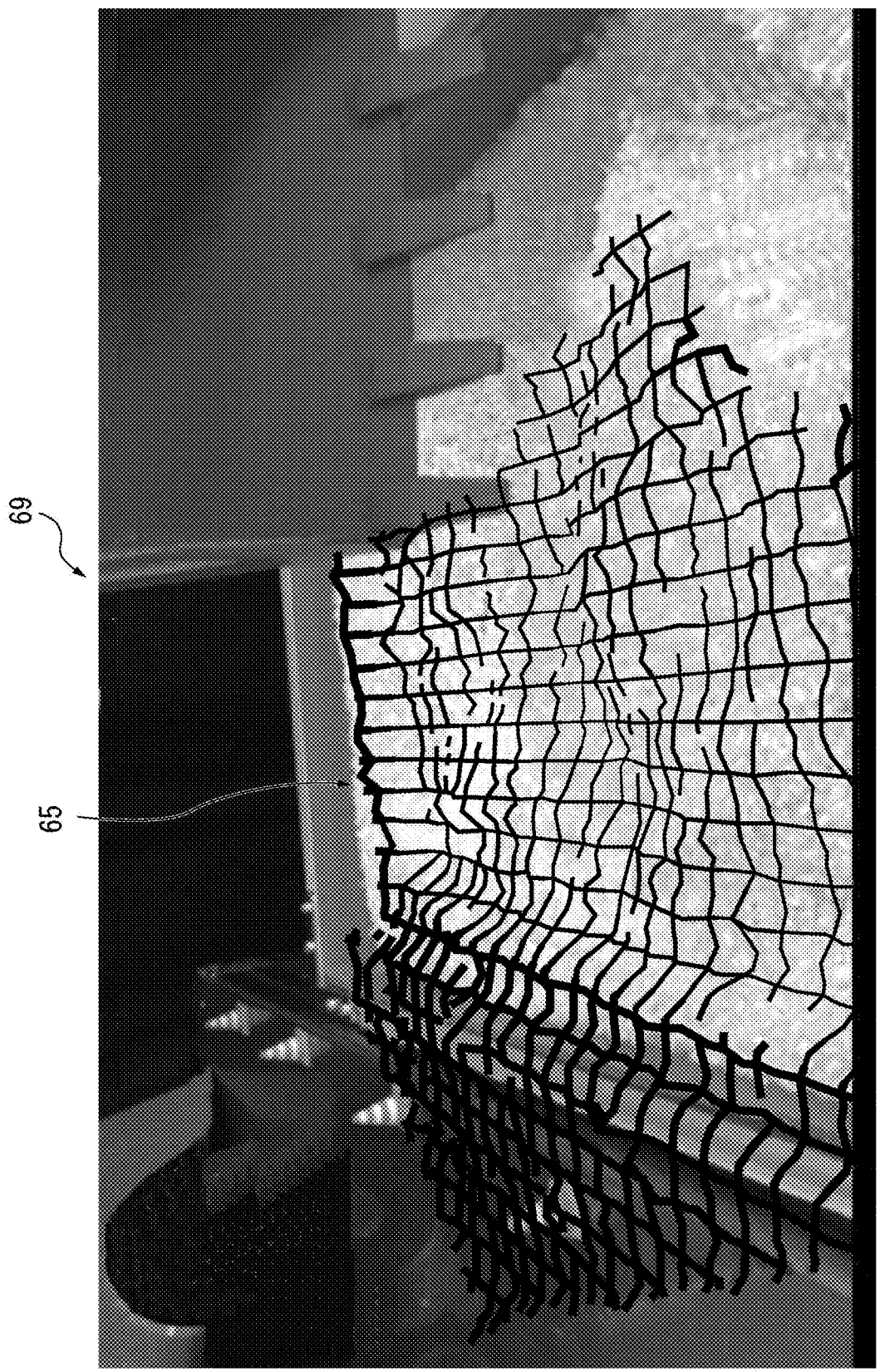
FIG. 20 is a diagram showing an image for work.

FIG. 20 is a diagram showing another example of an image 69 for work. In FIG. 20, the image 69 for work includes a lattice image 65 in which the thickness of a line is different depending on a distance in a normal direction. In the lattice image 65 shown in FIG. 20, as the distance is greater, a line diameter is set to be greater. In the example shown in FIG. 20, the work machine is a hydraulic excavator or the like.

In the embodiment, the lattice image 65 consisting of the first line image 66 and the second line image 67 are color-coded with different colors depending on the height. In this case, in the embodiment, it is possible to change a display form of a target on which the bulldozer 1100 (work machine) travels or performs work depending on a distance in a normal direction with respect to the ground surface of the bulldozer 1100, and for example, it is possible to make a display form of ruggedness or the like on a slope ground different from a display form of a periphery. That is, in the embodiment, since a color gauge of a height is decided with reference to the ground surface of the crawlers 1121, for example, it is possible to enable correct recognition of ruggedness on a slope ground during climbing.

In the work tool guide image 60, the blade edge position image 61 is displayed along the surface WAP of the work target WA and the lattice image 65. In an example shown in FIG. 19, an extension line image 61-1 and an extension line image 61-2 extending from the blade edge position image 61 are also displayed along the surface WAP of the work target WA and the lattice image 65. For this reason, since the operator can recognize a positional relationship between the blade 1132 and the work target WA with the lattice image 65 and the blade edge position image 61, work efficiency and work accuracy are improved. In the embodiment, the first straight line image 62 and the second straight line image 63 connect both ends of the blade edge position image 61 from both sides of the blade 1132 in the width direction Wb. The operator can more easily recognize the positional relationship between the blade 1132 and the work target WA with the first straight line image 62 and the second straight line image 63. Since the lattice image 65 and the blade edge position image 61 are displayed along the shape of a terrain (work target WA) to be worked, a relative positional relationship between the blade 1132 and the work target WA on a terrain surface (two-dimensionally) can be easily recognized. In addition, since the first line images 66 and the second line images 67 that constitute the lattice image 65 are displayed at equal intervals in the global coordinate system, a sense of distance on the terrain surface is easily recognized, and a sense of perspective is easily recognized.

In the embodiment, the image 69 for work can include information regarding a distance between the blade edge 1132e of the blade 1132 and the work target WA. With such a configuration, there is an advantage in that the operator can recognize an actual distance between the blade edge 1132e of the blade 1132 and the work target WA. The distance between the blade edge 1132e of the blade 1132 and the work target WA can be a distance between the blade edge 1132e at the center of the blade 1132 in the width direction Wb and the surface WAP of the work target WA.

Information regarding the distance to the work target WA may be spatial position information regarding the work tool or the work target WA, including information, such as information regarding the posture, for example, the angle of the blade 1132, information indicating a relative distance between the blade 1132 and the work target WA, information indicating a relationship between an orientation of, for example, the blade edge 1132e of the blade 1132 and an orientation of the surface of the work target WA, information indicating the position of blade 1132 by coordinates, information indicating the orientation of the surface of the work target WA, and information indicating a distance between the imaging device 19 and the blade edge 1132e of the blade 1132 in the y-direction in the local coordinate system, instead of the distance between the blade edge 1132e of the blade 1132 and the work target WA or in addition to the distance.

That is, the processing device 51 may obtain at least one of the position of blade 1132 as the work tool, the posture of the blade 1132, the position of the work target WA, a relative posture of the work target WA, a relative distance between the blade 1132 and the work target WA, and a relative posture of the blade 1132 and the work target WA and may display the obtained information on the display device 52, with the display processing unit 51P4.

As described above, the image display system 100 and the remote operation system 101 displays the work tool guide image 60 and the lattice image 65 generated as viewed from the imaging device 19 on the display device 52 to be superimposed on the image 68 of the actual work target WA captured by the imaging device 19. Through such processing, the image display system 100 and the remote operation system 101 can be configured such that the operator who remotely operates the bulldozer 1100 using the image of the work target WA displayed on the display device 52 can easily recognize the positional relationship between the position of the blade 1132 and the work target WA, and thus, work efficiency and work accuracy can be improved. Even an inexperienced operator can easily recognize the positional relationship between the position of the blade 1132 and the work target WA using the image display system 100 and the remote operation system 101. As a result, degradation of work efficiency and work accuracy is suppressed. Furthermore, the image display system 100 and the remote operation system 101 displays the work tool guide image 60, the lattice image 65, and the image 68 of the actual work target WA on the display device 52 in a superimposed manner, whereby a single screen to which the operator pays attention during work is required, and work efficiency can be improved.

In the lattice image 65, the interval between adjacent first line images 66 is equal to the interval between adjacent second line images 67. For this reason, the lattice image 65 and the image 68 of the actual work target WA captured by the imaging device 19 are displayed in a superimposed manner, whereby a work point on the work target WA is easily recognized. The blade edge position image 61 of the work tool guide image 60 and the lattice image 65 are superimposed, whereby the operator easily recognizes a movement distance of the blade 1132, and thus, work efficiency is improved.

Since the occupied area SA that is the area of the work equipment 1130 is removed from the work tool guide image 60 and the lattice image 65, the work tool guide image 60 and the lattice image 65 can be prevented from being distorted due to the occupied area SA and the work tool guide image 60 and the lattice image 65 can be prevented from being displayed on the work equipment 1130 in a superimposed manner. As a result, the image display system 100 and the remote operation system 101 can display the image 69 for work on the display device 52 in a visible form for the operator.

In the embodiment, the work tool guide image 60 may include at least the blade edge position image 61. The lattice image 65 may include at least a plurality of second line images 67, that is, a plurality of line images indicating the direction perpendicular to the front-rear direction of the vehicle body 1110 provided in the bulldozer 1100. The processing device 51 may change the color of the blade edge position image 61 in the work tool guide image 60 depending on the distance between the blade edge 1132e of the blade 1132 and the work target WA. With such a configuration, the operator easily recognizes the distance between the position of blade 1132 and the work target WA.

In the embodiment, although the processing device 51 converts information regarding the shape of the work target WA into the global coordinate system (X, Y, Z) to generate the work tool guide image 60 and the lattice image 65, the processing device 51 may not convert information regarding the shape of the work target WA into the global coordinate system (X, Y, Z). In this case, the processing device 51 handles information regarding the shape of the work target WA in the local coordinate system (x, y, z) of the bulldozer 1100 and generates the work tool guide image 60 and the lattice image 65. In a case where information regarding the shape of the work target WA is handled in the local coordinate system (x, y, z) of the bulldozer 1100, the GNSS antennas 21 and 22 and the global position calculation device 23 are not required.

In the above-described embodiment, a part (for example, the blade 1132 as described above) of the bulldozer 1100 detected by the distance detection device 20 is removed to obtain information (three-dimensional terrain data) regarding the shape of the work target WA. Note that three-dimensional terrain data acquired in the past (for example, several seconds ago) may be stored in the storage unit 51M of the processing device 51, and the processing unit 51P of the processing device 51 may determine whether or not the position of the current work target WA and the position indicated by the stored three-dimensional terrain data are identical, and in a case where both positions are identical, may display the lattice image 65 using past three-dimensional terrain data. That is, even though a terrain is hidden by part of the bulldozer 1100 as viewed from the imaging device 19, in a case where there is past three-dimensional terrain data, the processing device 51 can display the lattice image 65.

The lattice image 65 may be displayed, for example, using a local coordinate system as a polar coordinate system, instead of displaying the lattice image 65 using the lattice. Specifically, concentric circles at equal intervals depending on a distance from the center of the bulldozer 1100 (for example, the swing center of the vehicle body 1110) may be drawn as line images (second line images), and radial line images (first line images) at equal intervals from the swing center may be drawn depending on a swing angle of the vehicle body 1110. In this case, the second line images that the concentric circle line images intersect the first line image that are the radial line images from the swing center. Such a lattice image is displayed, whereby it is also possible to easily recognize the positional relationship between the position of the blade 1132 and the work target WA at the time of swing or excavation.

<Modification Example of Control System of Bulldozer 1100>

Although the image display system 100 and the remote operation system 101 described above remotely operate the bulldozer 1100 using the operation device 53 of the facility 50 shown in FIG. 1, the display device 52 may be provided in the cab 1140 shown in FIG. 2 or the image 69 for work may be displayed on the display device 52 in the cab 1140 to assist the work of the operator for the bulldozer 1100. In this case, the bulldozer 1100 can be configured such that the operator who operates the bulldozer 1100 using the image of the work target WA displayed on the display device 52 easily recognizes the positional relationship between the position of blade 1132 and the work target WA. As a result, work efficiency and work accuracy can be improved. Furthermore, even an inexperienced operator can easily recognize the positional relationship between the position of blade 1132 and the work target WA. As a result, degradation of work efficiency and work accuracy is suppressed. In addition, in night work or the like, even though the operator hardly sees the actual work target WA, the operator can perform work while viewing the work tool guide image 60 and the lattice image 65 displayed on the display device 52, and thus, degradation of work efficiency is suppressed.

Although the embodiment has been described above, the embodiment is not limited by the content described above. Furthermore, the above-described components include those that can be easily assumed by those skilled in the art, substantially the same one, and so-called equivalents. In addition, the above-described components can be appropriately combined. Moreover, at least one of various omissions, substitutions, and alterations of the components can be performed without departing from the spirit and scope of the embodiment. The work machine is not limited to the bulldozer 1100 and may be other work machines, such as a wheel loader or a hydraulic excavator. Although the blade (work equipment) of the bulldozer has been an exemplary example of the occupied area, a hood of the vehicle body or an exhaust pipe may be added to the occupied area in addition to the work equipment.

INDUSTRIAL APPLICABILITY

According to the above-described disclosure of the invention, since it is possible to change the display form of a target on which the work machine travels or performs work, depending on the distance in the normal direction with respect to the ground surface of the work machine, for example, it is possible to make a display form of ruggedness or the like present on a slope ground different from a display form of a periphery.

REFERENCE SIGNS LIST

1100: Bulldozer
1110: Vehicle body
1120: Traveling device
1130: Work equipment
1132: Blade
1132e: Blade edge
1S: Control system
19: Imaging device
20: Distance detection device
21, 22: Antenna (GNSS antenna)
23: Global position calculation device
26: Sensor controller
27: Work equipment control device
32: Posture detection device
33: IMU
50: Facility
51: Processing device
52: Display device
53: Operation device
60: Work tool guide image (image)
61: Blade edge position image
62: First straight line image
63: Second straight line image
65: Lattice image
66: First line image
67: Second line image
68: Image
69: Image for work
100: Image display system for work machine (display system)
101: Remote operation system for work machine (remote operation system)

The invention claimed is:

1. A display system for a work machine, the display system comprising:
a processor and a storage unit,
wherein the processor has functional elements including:
an acquisition unit configured to acquire three-dimensional data of an actual terrain of a plurality of measurement points measured by a distance detection device mounted in the work machine;
a conversion unit configured to convert the three-dimensional data into a vehicle body coordinate system defined in association with a vehicle body of the work machine;
an image generation unit configured to generate a reference image representing a three-dimensional shape of the actual terrain based on the three-dimensional data converted into the vehicle body coordinate system; and
a display processing unit configured to display the reference image on an image captured by an imaging device in a superimposed manner,
wherein the image generation unit decides a display form of the reference image at a position of the reference image corresponding to each measurement point depending on a distance of the measurement point in a normal direction with respect to a ground surface of the work machine, in a target on which the work machine travels or performs work.

2. The display system according to claim 1,
wherein the reference image includes a plurality of line images.

3. The display system according to claim 2,
wherein the reference image includes a lattice by the plurality of line images.

4. The display system according to claim 3,
wherein the display form is coloring of the reference image.

5. The display system according to claim 3,
wherein the display form is a thickness of a line of the line image.

6. The display system according to claim 1,
wherein the display form is coloring of the reference image.

7. The display system according to claim 1,
wherein the image generation unit differs the display form from a case where the work machine is grounded on a horizontal plane to a case where the work machine is grounded on a slope surface.

8. The display system according to claim 2,
wherein the display form is a thickness of a line of the line image.

9. The display system according to claim 2,
wherein the display form is coloring of the reference image.

10. A display method comprising the steps of:
acquiring three-dimensional data of an actual terrain of a plurality of measurement points measured by a distance detection device mounted in a work machine;
converting the three-dimensional data into a vehicle body coordinate system defined in association with a vehicle body of the work machine;
generating a reference image representing a three-dimensional shape of the actual terrain based on the three-dimensional data converted into the vehicle body coordinate system; and
displaying, on a display device, the reference image on an image captured by an imaging device in a superimposed manner,
wherein the step of generating the reference image includes a step of deciding a display form of the reference image at a position of the reference image corresponding to each measurement point depending on a distance of the measurement point in a normal direction with respect to a ground surface of the work machine, in a target on which the work machine travels or performs work.

11. A remote operation system for a work machine comprising:
the display system according to claim 1;
a detection device configured to detect a posture of the work machine;
a display device disposed at a location away from the work vehicle and configured to display an image by processing of the display processing unit; and
an operation device disposed at a location away from the work machine and configured to remotely operate the work machine.

12. A remote operation system for a work machine comprising:
the display system according to claim 2;
a detection device configured to detect a posture of the work machine;
a display device disposed at a location away from the work vehicle and configured to display an image by processing of the display processing unit; and
an operation device disposed at a location away from the work machine and configured to remotely operate the work machine.

13. A remote operation system for a work machine comprising:
the display system according to claim 3;
a detection device configured to detect a posture of the work machine;
a display device disposed at a location away from the work vehicle and configured to display an image by processing of the display processing unit; and
an operation device disposed at a location away from the work machine and configured to remotely operate the work machine.

14. A remote operation system for a work machine comprising:
the display system according to claim 6;
a detection device configured to detect a posture of the work machine;
a display device disposed at a location away from the work vehicle and configured to display an image by processing of the display processing unit; and
an operation device disposed at a location away from the work machine and configured to remotely operate the work machine.

15. A remote operation system for a work machine comprising:
the display system according to claim 8;
a detection device configured to detect a posture of the work machine;
a display device disposed at a location away from the work vehicle and configured to display an image by processing of the display processing unit; and
an operation device disposed at a location away from the work machine and configured to remotely operate the work machine.

* * * * *